United States Patent
Sathish et al.

(10) Patent No.: US 10,140,384 B2
(45) Date of Patent: Nov. 27, 2018

(54) DYNAMICALLY MODIFYING ELEMENTS OF USER INTERFACE BASED ON KNOWLEDGE GRAPH

(71) Applicant: Samsung Electronics Co., Ltd., Suwon-si, Gyeonggi-do (KR)

(72) Inventors: Sailesh Kumar Sathish, Bangalore (IN); Nirmesh Neema, Indore (IN); Bhavani Shankar Yeleswarapu, Vijayawada (IN); Ravitheja Tetali, Visakhapatnam (IN); Satnam Singh, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 801 days.

(21) Appl. No.: 14/619,553

(22) Filed: Feb. 11, 2015

(65) Prior Publication Data
US 2016/0103932 A1   Apr. 14, 2016

(30) Foreign Application Priority Data

Feb. 13, 2014  (IN) .............................. 673/CHE/2014
Oct. 10, 2014  (IN) .............................. 673/CHE/2014
Feb. 9, 2015   (KR) ........................ 10-2015-0019445

(51) Int. Cl.
*G06F 17/30*   (2006.01)
*G06F 3/0484*  (2013.01)
(Continued)

(52) U.S. Cl.
CPC .... *G06F 17/30958* (2013.01); *G06F 3/04847* (2013.01); *G06F 3/04883* (2013.01);
(Continued)

(58) Field of Classification Search
CPC ....... G06F 17/30705; G06F 2203/0338; G06F 17/20
See application file for complete search history.

(56) References Cited

U.S. PATENT DOCUMENTS 6,038,560 A *  3/2000  Wical ................ G06F 17/30672
6,523,026 B1 * 2/2003  Gillis ................ G06F 17/30637
(Continued)

FOREIGN PATENT DOCUMENTS

EP   1 971 118 A1   9/2008

OTHER PUBLICATIONS

Maunendra Sankar Desarkar et al., Med-Tree: A User Knowledge Graph Framework for Medical Applications, 13th IEEE International Conference on Bioinformatics and Bioengineering, IEEE, XP032541351, pp. 1-4, Nov. 10, 2013.
(Continued)

*Primary Examiner* — William L Bashore
*Assistant Examiner* — Rayeez R Chowdhury
(74) *Attorney, Agent, or Firm* — Jefferson IP Law, LLP

(57) ABSTRACT

A method and a system for dynamically modifying at least one element of a User Interface (UI) of a first electronic device are provided. The method includes collating usage information of at least one data source in the first electronic device, categorizing the collated usage information into one or more knowledge clusters, forming a knowledge graph using the one or more knowledge clusters, and dynamically modifying the at least one element of the UI based on the knowledge graph.

30 Claims, 20 Drawing Sheets

(51) Int. Cl.
  *G06F 3/0488* (2013.01)
  *G06N 5/02* (2006.01)
  *G06F 9/445* (2018.01)
  *H04M 1/725* (2006.01)
  *G06F 9/451* (2018.01)
(52) U.S. Cl.
  CPC ............ *G06F 9/4451* (2013.01); *G06F 9/451* (2018.02); *G06F 17/3097* (2013.01); *G06F 17/30705* (2013.01); *G06F 17/30731* (2013.01); *G06F 17/30867* (2013.01); *G06N 5/025* (2013.01); *H04M 1/72563* (2013.01); *H04M 1/72569* (2013.01)

(56) References Cited

U.S. PATENT DOCUMENTS

| | | | | |
|---|---|---|---|---|
| 2001/0044827 | A1* | 11/2001 | Zhuk | G06N 5/043 709/205 |
| 2006/0020566 | A1 | 1/2006 | Wu et al. | |
| 2006/0026521 | A1* | 2/2006 | Hotelling | G06F 3/0418 715/702 |
| 2008/0227440 | A1 | 9/2008 | Settepalli | |
| 2009/0248678 | A1 | 10/2009 | Okamoto et al. | |
| 2009/0254543 | A1* | 10/2009 | Ber | G06F 17/30675 |
| 2010/0223335 | A1* | 9/2010 | Fu | H04L 12/1818 709/205 |
| 2011/0246520 | A1* | 10/2011 | Koister | G06Q 10/101 707/771 |
| 2012/0309464 | A1* | 12/2012 | Lim | H04M 1/72522 455/566 |
| 2013/0145321 | A1* | 6/2013 | Horiuchi | G06F 3/0483 715/830 |
| 2013/0318025 | A1 | 11/2013 | Alemzadeh et al. | |
| 2014/0040271 | A1 | 2/2014 | Thuler et al. | |
| 2014/0046934 | A1* | 2/2014 | Zhou | G06F 17/30864 707/723 |
| 2014/0081801 | A1* | 3/2014 | Lee | G06Q 30/0282 705/26.8 |
| 2014/0236570 | A1* | 8/2014 | Heck | G06F 17/2785 704/9 |
| 2014/0280242 | A1* | 9/2014 | Cheng | G06F 17/30663 707/750 |
| 2014/0297644 | A1* | 10/2014 | Cheng | G06F 17/277 707/737 |
| 2015/0310491 | A1* | 10/2015 | Kraft | G06Q 30/0263 705/14.6 |
| 2015/0332672 | A1* | 11/2015 | Akbacak | G10L 15/18 704/257 |
| 2015/0370787 | A1* | 12/2015 | Akbacak | G06F 17/2836 704/2 |
| 2016/0098645 | A1* | 4/2016 | Sharma | G06N 7/005 706/12 |

OTHER PUBLICATIONS

Rahul Jain et al., Context Based Adaptation of Application Icons in Mobile Computing Devices, 2013 Third WOrld Congress on Information and Communication Technologies (WICT 2013), IEEE, XP032780455, pp. 31-36, Dec. 15, 2013.

Ravitheja Tetali et al., Browser with Clustering of Web Documents, 2013 2nd International Conference on Advanced Computing, Networking and Security, IEEE, XP032551802, pp. 164-168, Dec. 15, 2013.

* cited by examiner

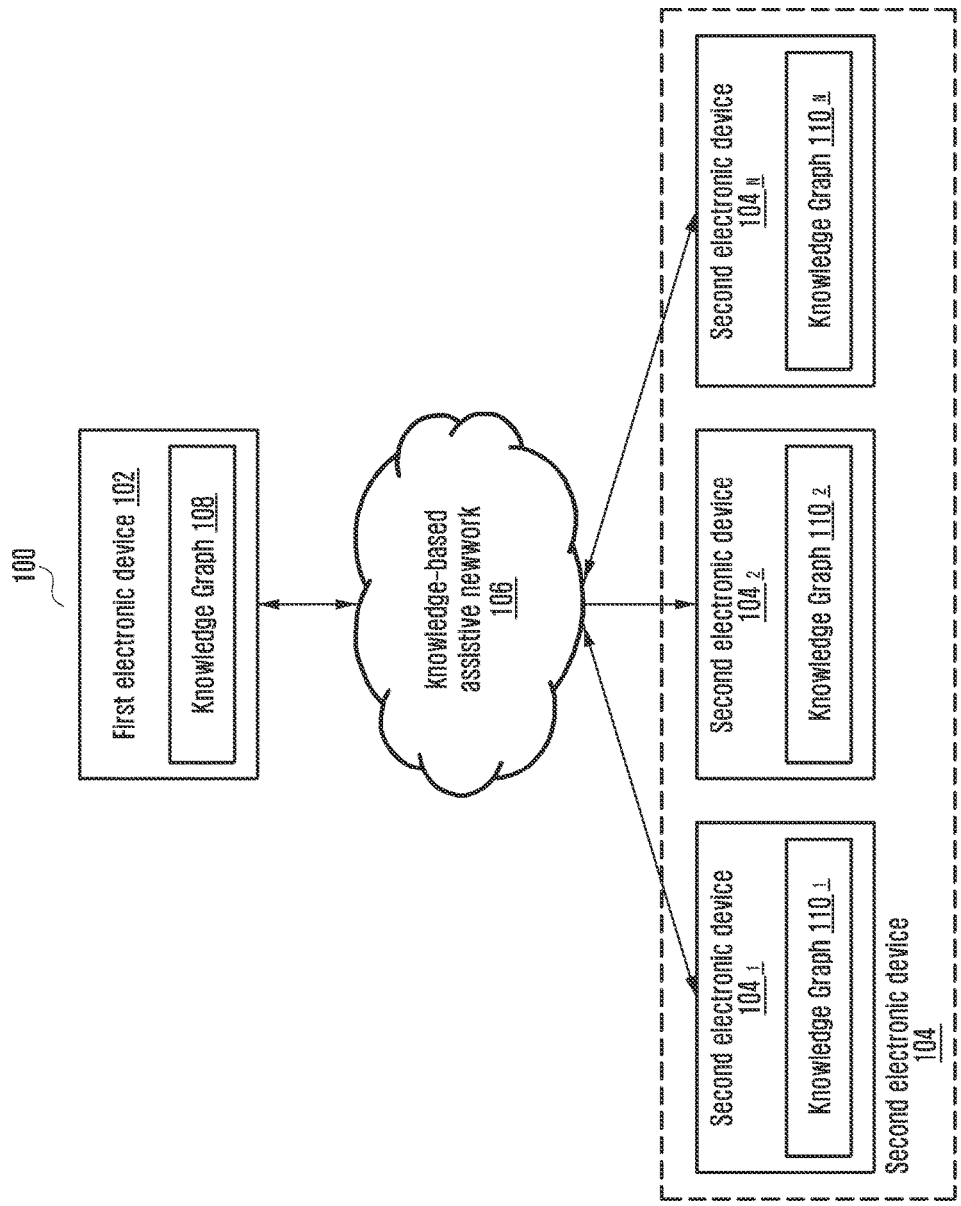

DYNAMICALLY MODIFYING ELEMENTS OF USER INTERFACE BASED ON KNOWLEDGE GRAPH

CROSS-REFERENCE TO RELATED APPLICATION(S)

This application claims the benefit under 35 U.S.C. § 119(a) of an Indian provisional application filed on Feb. 13, 2014 in the Indian Intellectual Property Office and assigned Serial number 673/CHE/2014, and an Indian regular patent application filed on Oct. 10, 2014 in the Indian Intellectual Property Office and assigned Serial number 673/CHE/2014, and under 35 U.S.C. § 119(a) of a Korean patent application filed on Feb. 9, 2015 in the Korean Intellectual Property Office and assigned Serial number 10-2015-0019445, the entire disclosures of each of which are hereby incorporated by reference.

TECHNICAL FIELD

The present disclosure relates to a knowledge system. More particularly, the present disclosure relates to a mechanism for dynamically modifying one or more elements of a User Interface (UI) based on a knowledge graph.

BACKGROUND

Knowledge of a user is expanding exponentially via user interaction through knowledge supplying interactive portals, or communities exchanging information constantly over a network. Different systems and methods are proposed to maintain a knowledge graph of a user. In one mechanism, data in the form of a generic knowledge graph is stored in a remote database and the stored data can be retrieved by providing a query on a user electronic device. Identifying the data based on the query within the network may increase the network bandwidth usage. The data identified may not be locally relevant to the query or do not take current user context (such as location) and user knowledge into account. Further, the data stored in the remote database remains static until an entity such as an administrator or owner manually updates the data or with semi-automated support from deployed systems. Additionally, the knowledge graph data is not personal information of the user, but rather data is related to world entities in general.

In another mechanism, current knowledge graphs are entity based, i.e., they capture the relation between entities in the world. In traditional classification systems, supervised models are used where topics and their tokens are manually updated by the user. The user should continually update the supervised models for classification (i.e., classifying a web page). Further, the conventional methods and system may not differentiate between interest and knowledge and may not have a measurement when user's interest transforms into knowledge.

Thus there remains a need for a robust system and method for automatically constructing a knowledge graph of a user that captures the user's level of knowledge.

The above information is presented as background information only to assist with an understanding of the present disclosure. No determination has been made, and no assertion is made, as to whether any of the above might be applicable as Prior Art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and system for dynamically modifying one or more elements of a User Interface (UI) of an electronic device based on a knowledge graph constructed within the electronic device.

Another aspect of the present disclosure is to provide a mechanism for constructing a knowledge graph of a user that captures user's knowledge along with user's level of knowledge.

Another aspect of the present disclosure is to provide a mechanism for sharing a knowledge graph of a first electronic device with a second electronic device in a knowledge-based assistive network.

Another aspect of the present disclosure is to provide a mechanism for differentiating between user interest and knowledge.

In accordance with an aspect of the present disclosure, a method for dynamically modifying at least one element of a User Interface (UI) of a first electronic device is provided. The method includes collating usage information of at least one data source in the first electronic device, categorizing the collated usage information into at least one knowledge cluster, forming a knowledge graph using the knowledge cluster, and dynamically modifying the at least one element of the UI based on the knowledge graph.

In accordance with another aspect of the present disclosure, a system for dynamically modifying at least one element of a UI of a first electronic device is provided. The system is configured to collate usage information of at least one device, categorize the collated usage information into at least one knowledge cluster, form a knowledge graph using the knowledge cluster, and dynamically modify the element of the UI based on the knowledge graph.

In accordance with another aspect of the present disclosure, an electronic device includes a communication module, a display configured to display a user interface (UI), a touch sensitive unit configured to receive a user's touch input, and a processor. The processor is configured to collate usage information of at least one data source in the electronic device, to categorize the collated usage information into at least one knowledge cluster, to form a knowledge graph using the at least one knowledge cluster, and to dynamically modify the at least one element of the UI based on the knowledge graph.

Other aspects, advantages, and salient features of the disclosure will become apparent to those skilled in the art from the following detailed descriptions, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 1A and 1B illustrate, among other things, a high level overview of a system for dynamically modifying at least one element of a User Interface (UI) of a first electronic device according to various embodiments of the present disclosure;

Throughout the drawings, it should be noted that like reference numbers are used to depict the same or similar elements, features, and structures.

DETAILED DESCRIPTION

Figure 1B:
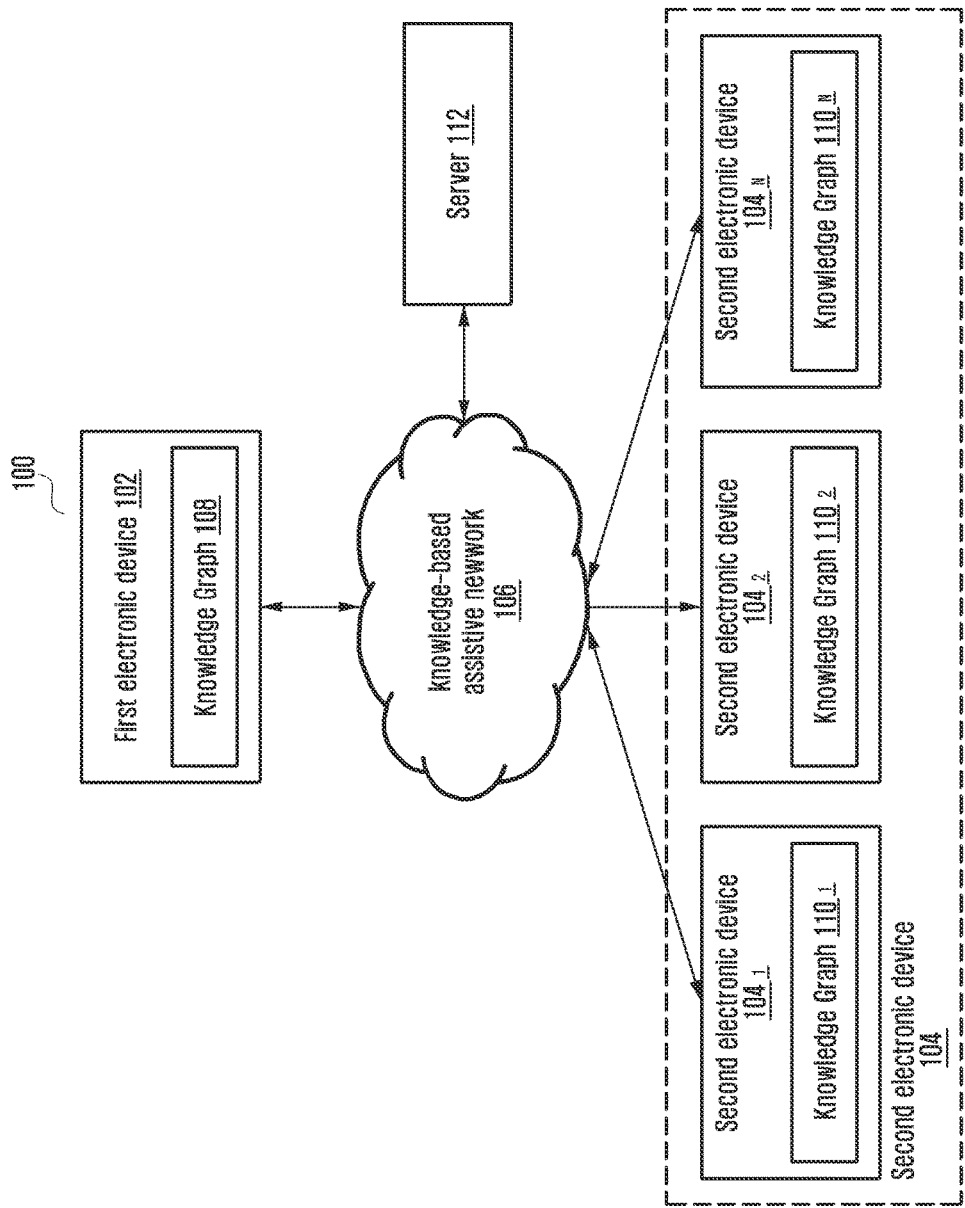

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Prior to describing the various embodiments in detail, it is useful to provide definitions for key terms and concepts used herein. Unless defined otherwise, all technical and scientific terms used herein have the same meaning as commonly understood by a personnel having ordinary skill in the art to which this disclosure belongs.

"Knowledge-based assistive network" refers to a network that assists a user in retrieving data to assist the user for taking decision effectively. The assistive network includes one or more electronic devices along with their knowledge graph locally stored in each electronic device. Each electronic device represents a node and connected to each other forming the knowledge-based assistive network. Further, the assistive network enables the user to provide intent and allows a peer-peer or point-point via use of a broker server knowledge base search across one or more electronic devices based using localized queries. The peer-to-peer or point-to-point knowledge base search is implemented by computing a semantic similarity between the intent of the user and the knowledge data available on each electronic device within the assistive network.

"Knowledge cluster" refers to information related to a topic of interest or a domain knowledge that can be displayed on the electronic device. The knowledge cluster can be classified into one or more topics representing the domain(s) in which the user perceives or has knowledge about. For example, the user may have knowledge in politics in office and politics in Bollywood; a knowledge cluster "politics" can be created which is classified into different topics such as "politics in office" and "politics in Bollywood". In an embodiment, the knowledge cluster can be associated with, for example, a person, a company, an entity, or the like.

"Knowledge graph" refers to a knowledge base that may be represented by using a visually appealing graphical presentation. Knowledge graph organizes information in the form of nodes, knowledge clusters, topics, sub-topics, keywords in the electronic device. The clusters or nodes in the knowledge graph represent the individual knowledge in at least one domain such as for example, but not limited to, generic topics, specific topics, places, organizations, sports, teams, works, movies, and so on. For example, if a user has knowledge about politics, intellectual property, and the like, then clusters, namely, "politics" and "intellectual property", may be created. The cluster "politics" can include various topics, such as "politics in office" and "politics in Bollywood", indicating the topics in which the user perceives the knowledge. Similarly, the cluster "intellectual property" can include topics, such as "patents", "trademarks", and "copyright".

"Localized query" refers to a query that is constructed on the server based on the knowledge cluster definition or the intent received from one or more electronic devices and individually or separately sent to each electronic device connected available in the knowledge-based assistive network to locally search the data in individual's knowledge graph.

"Intent" refers to a topic of interest that a user is looking for in the electronic device by performing an activity on the electronic device. The intent can be specified either implicitly or explicitly by the user in the electronic device by performing one or more activities on an application.

"Activity" refers to any user's activity performed on the data source. Typical example of the user activities can include for example, but not limited to, browsing, typing a search query, selecting keywords, commenting, liking, posting, sharing, saving, or the like.

"Word vector" refers to the magnitude and direction of the content under the context of a topic. In an embodiment, the word vector may use correlation between the content of the same topic and context of a topic based on keywords identified in the knowledge graph.

"Token" refers to a unique identifier that identifies the various topics, keywords, and the like in the data sources, or the knowledge graph.

"Semantic similarity" refers to analyzing the keywords, topics in the data source for determining semantic correlation of the usage information extracted from the data sources. In an embodiment, the data source described herein can be stored items or any application running in the electronic device. For example, the data source can be a Short Messaging Service (SMS), a Call log application, user documents, a browser application, a contacts application, one or more social networking service applications, and the like.

The various embodiments herein achieve a method and system for dynamically modifying one or more elements of a User Interface (UI) of a first electronic device. The method includes collating usage information of one or more data sources in the first electronic device. Further, the method includes categorizing the collated usage information into one or more knowledge clusters.

In an embodiment, categorizing the collated usage information into the knowledge clusters includes extracting semantic content from the usage information collated from each data source in the first electronic device. In an embodiment, the semantic content includes a word vector or a structure data or a topic or a token. The token can be, for example but not limited to a keyword, a Uniform Resource Locator (URL), or the like. The extracted semantic content is mapped to categorize the collated usage information into the knowledge cluster using an incremental model.

Further, the method includes correlating the knowledge cluster to form a knowledge graph. Unlike conventional systems, the knowledge graph can be stored locally in the first electronic device. Further, the method includes dynamically modifying the element of the UI based on the knowledge graph. Furthermore the method includes frequently monitoring the usage information of the data sources in the first electronic device. Based on the monitoring results, the knowledge cluster can be updated by for example, adding a semantic content to the knowledge cluster, splitting the knowledge cluster, merging the knowledge cluster, or the like.

The method and system described herein is simple and robust for automatically modifying one or more elements of the UI based on the user knowledge graph.

In conventional systems, the interest and knowledge of the user may not be effectively differentiated and may not have a mechanism to monitor and measure when the user's interest transforms into knowledge. A common knowledge graph including user static information is generated, maintained, and remains in a server using supervised learning models, where all the users can access it. A trained model generated using Latent Dirichlet Allocation (LDA) and using open source data is built first. The first set of models wherein each corresponds to a topic is labeled. This model is then used in matching process against extracted interest vectors from user documents. Based on the extracted user interests, the initial set of models generated also get updated so that over time it starts reflecting more of that user's interests and fine tuned to the user. Unlike conventional systems, the individual knowledge graph can be generated, maintained, and fully stored locally in the individual electronic device itself. The individual dynamic interests along with the static interests are used to generate the individual knowledge graph. Further, the data can be clustered using vectors and used to build topic models where weightage of each topic model can be computed by determining the size of the topic graph. This information can be used by applications to do adaptation. For example, the camera UI adapting itself to the user based on the user level of knowledge about the control settings, light metering, shutter speed, panoramic shot, and the like, when the user learns about photography. Otherwise the camera UI provides basic settings to the user. As the knowledge graph can be generated and maintained locally at the electronic device itself, the proposed system and method can be used to maintain the privacy of the user data.

Generally, the knowledge graph of the user dynamically grows based on the topics that user's assimilate (via browsing, social, chat, SMS, and the like). For example, consider a scenario where the user browses one or more URLs belonging to a news category and a sports category. Alternatively, pre-loaded cluster models (i.e., News cluster and Sports cluster) in the electronic device of the user can be used to initiate mapping of the URLs that the user has browsed (or is browsing) so as to start the clustering process. The browsed (or browsing) URLs of the user can be mapped to the News cluster and the Sports cluster by using an incremental modeling, such as to dynamically modify the UI element of the browser based on the knowledge graph.

The labels such as "first", and "second," are used merely to describe the various embodiments, and do not limit the scope of the disclosure.

Referring now to the drawings, and more particularly to FIGS. 1 through 16, where similar reference characters denote corresponding features consistently throughout the figures, there are shown preferred embodiments.

FIGS. 1A and 1B illustrate, among other things, a high level overview of a system 100 for dynamically modifying one or more elements of a UI of a first electronic device 102 according to various embodiments of the present disclosure.

Referring to FIGS. 1A and 1B, the system 100 includes a first electronic device 102, one or more second electronic devices $104_{1-N}$ (here after referred to as second electronic device 104), and a knowledge-based assistive network 106. The first electronic device 102 or the second electronic device 104 can be, for example and not limited to, a mobile phone, a smart phone, a Personal Digital Assistant (PDA), a tablet, a phablet, a computer, a communicator, or any other electronic device.

Each electronic device can include a knowledge graph 108. In an embodiment, the knowledge graph 108 represents the information of respective user associated with the electronic device in the form of a graph that includes clusters (i.e., nodes), topics, sub-topics and keywords. One or more second electronic devices $104_{1-N}$ can include one or more knowledge graphs $110_{1-N}$ (here after referred to as knowledge graph 110). The knowledge graph 110 represents the information of a second user associated with the second electronic device 104.

The first electronic device 102 or the second electronic device 104 can be configured to dynamically collate usage information of one or more data sources associated with the user. For example, the first electronic device 102 dynamically collates the usage information of the data sources associated with the first user. In another example, the second electronic device 104 dynamically collates the usage information of the data sources associated with the second user. In an embodiment, the data sources can include a SMS application, a Call log application, User documents, blogs, a browser application, browsing activity information, a Chat application, and Social Networking Site (SNS) Sources. In an embodiment, the usage information can include for example but not limited to, browsing history, SNS information, application usage data which are dynamically collated from the data sources. In another embodiment, the usage information of the user can include, for example, web page URLs visited by the user, emails sent by the user, emails received by the user, text messages sent by the user, text messages received by the user, documents viewed by the user, documents edited by the user, instant messages sent by the user, instant messages received by the user, user-device interactive data, user's dynamic context information, or the like. The details of the data sources associated with the first electronic device 102 or the second electronic device 104 are explained in conjunction with the FIG. 2.

The first electronic device 102 or the second electronic device 104 categorizes the collated usage information into one or more knowledge clusters. The first electronic device 102 or the second electronic device 104 correlates each knowledge cluster to form a knowledge graph, which can be stored locally in the first electronic device 102 or the second electronic device 104 itself. Based on the knowledge graph, the UI of the first electronic device 102 or the second electronic device 104 can be dynamically modified.

In an embodiment, the knowledge graph of the first user associated with the first electronic device 102 can be shared with the second electronic device 104 through the network 106. In another embodiment, the knowledge graph of the second user associated with the second electronic device 104 can be shared with the first electronic device 102. For example, Father's selective knowledge clusters can be shared with daughter's electronic device for safe browsing. Further, the first electronic device 102 or the second electronic device 104 can include appropriate interfaces to directly or indirectly communicate with various other devices over the knowledge-based assistive network 106.

The knowledge-based assistive network 106 described herein can be for example, but not limited to, wireless network, wire line network, public network such as the Internet, private network, Global System for Mobile communications (GSM) network, General Packet Radio Service (GPRS), Local Area Network (LAN), Wide Area Network (WAN), Metropolitan Area Network (MAN), cellular network, Public Switched Telephone Network (PSTN), personal area network, a combination thereof, or any other network.

Further, the first electronic device 102 or the second electronic device 104 can be configured to frequently monitor the usage information of the data sources. If it is determined that any update in the usage information is detected, then the knowledge cluster is updated by adding the semantic content or splitting the knowledge cluster or merging the knowledge cluster using an incremental model. For example, updating of the knowledge cluster can be performed periodically (e.g., every N number of hours, every day, every week) and/or incrementally as the usage information becomes available.

Further, referring to FIG. 1B, the system 100 can include the first electronic device 102, one or more second electronic devices $104_{1-N}$ (here after referred as second electronic device 104), knowledge-based assistive network 106, and a server 112. Also, the various embodiments described herein can be performed with the help of the server 112 without departing from scope of the disclosure. The server 112 is used synchronize the unsupervised knowledge clusters between the first electronic device 102 and the second electronic device 104 so that both the devices will have same definition and same labels for the unsupervised knowledge clusters.

In an embodiment, the server 112 receives the unsupervised knowledge cluster definitions (i.e., word vector of tokens) from the first electronic device 102 and the second electronic device 104. In an embodiment, the server 112 can receive unsupervised knowledge clusters from one or more electronic devices. On receiving the unsupervised knowledge cluster definitions, the server 112 compares the similar knowledge cluster definitions and assigns a single label to the knowledge clusters. Further, the server 112 sends the assigned single label to the first electronic device 102 and the second electronic device 104; thereby, synchronizing the label of the knowledge clusters. Unlike conventional systems, it avoids requiring the users to manually update the knowledge cluster labels. For example, consider a scenario where the server 112 receives unsupervised knowledge cluster definition "IPL in Bollywood" from the first electronic device 102 and the unsupervised knowledge cluster definition "IPL of star heroes" from the second electronic device 104. The server 112 compares the knowledge cluster "IPL in Bollywood" and the knowledge cluster "IPL of star heroes" and assigns the common label as "IPL". The server 112 sends the single label "IPL" to the first electronic device 102 and the second electronic device 104. On receiving the common label "IPL", the first electronic device 102 replaces unsupervised knowledge cluster definition "IPL in Bollywood" with the single label "IPL" and the second electronic device 104 replaces unsupervised knowledge cluster definition "IPL of star heroes" with the single label "IPL". Therefore, the unsupervised knowledge cluster definitions of the first electronic device 102 and the second electronic device 104 are synchronized using the server 112.

In an embodiment, a topic or a cluster for new data is identified and synchronizes the clusters and the labels using the server 112 which synchronizes cluster labels in all electronic devices thereby, maintaining uniform vocabulary and uniform definition for the clusters. The device manager (not shown) keeps track of the clusters formed and decides when each cluster "matures," i.e., new or similar URLs get mapped to the cluster without the cluster undergoing any modifications (i.e., in label and existing URLs (that do not get removed from the cluster)). Each cluster is given a unique ID which only needs to be resolvable within the user device. The device manager sends a serialized version of the cluster along with the ID, the label, prominent URL vector patterns defining the cluster, as well as the set of topic vectors to the server 112. The server 112 performs a collaborative comparison of topic vectors between the devices and the cluster patterns. The clusters having similar patterns are given the same labels and sent back to the devices with the cluster ID for resolution within the device. In some instances, the server 112 can also ask to modify the word vectors by sending a common vector list to the electronic devices. The server 112 maintains the topic vector lists, cluster definitions (patterns of vector lists), and cluster labels. So based on the maturity levels of cluster formation at the device, the server 112 constructs a synchronized universal model, which will converge and is also dynamic.

In an embodiment, the server 112 can be configured to determine one or more users in proximity to the first user associated with the first electronic device 102, who are similar. The first user sends a query or a vector to the server 112 using the first electronic device 102. For example, to determine the users around the first user who are interested in machinery, the vector of topic "machinery" is sent to the server 112. The server 112 creates a proximity limit around the first user who has sent the query "machinery". The server 112 determines the users who are in proximity (i.e., within 50 meters around the first electronic device 102) and sends the query to the second electronic devices 104 which are in proximity. On receiving the query, the each second electronic device 104 compares the query with the stored knowledge clusters. If any second user associated with the second electronic device 104 with sufficient match is determined, then a notification is be sent to the first electronic device 102 through the server 112 where the server 112 accepts the second electronic device 104 and profile data of the first user is not shared with the second electronic devices 104. The list of second electronic devices 104 are displayed on the UI of the first electronic device 102.

FIGS. 1A and 1B show a limited overview of the system 100, but it is to be understood that other various embodiments are not limited thereto. Further, the system 100 can include any number of electronic devices and servers along with other hardware or software components communicating with each other. For example, the component can be, but not limited to, a process running in the controller or processor, an object, an executable process, a thread of execution, a program, or a computer. By way of illustration, both an application running on a device and the device itself can be a component.

Figure 2:
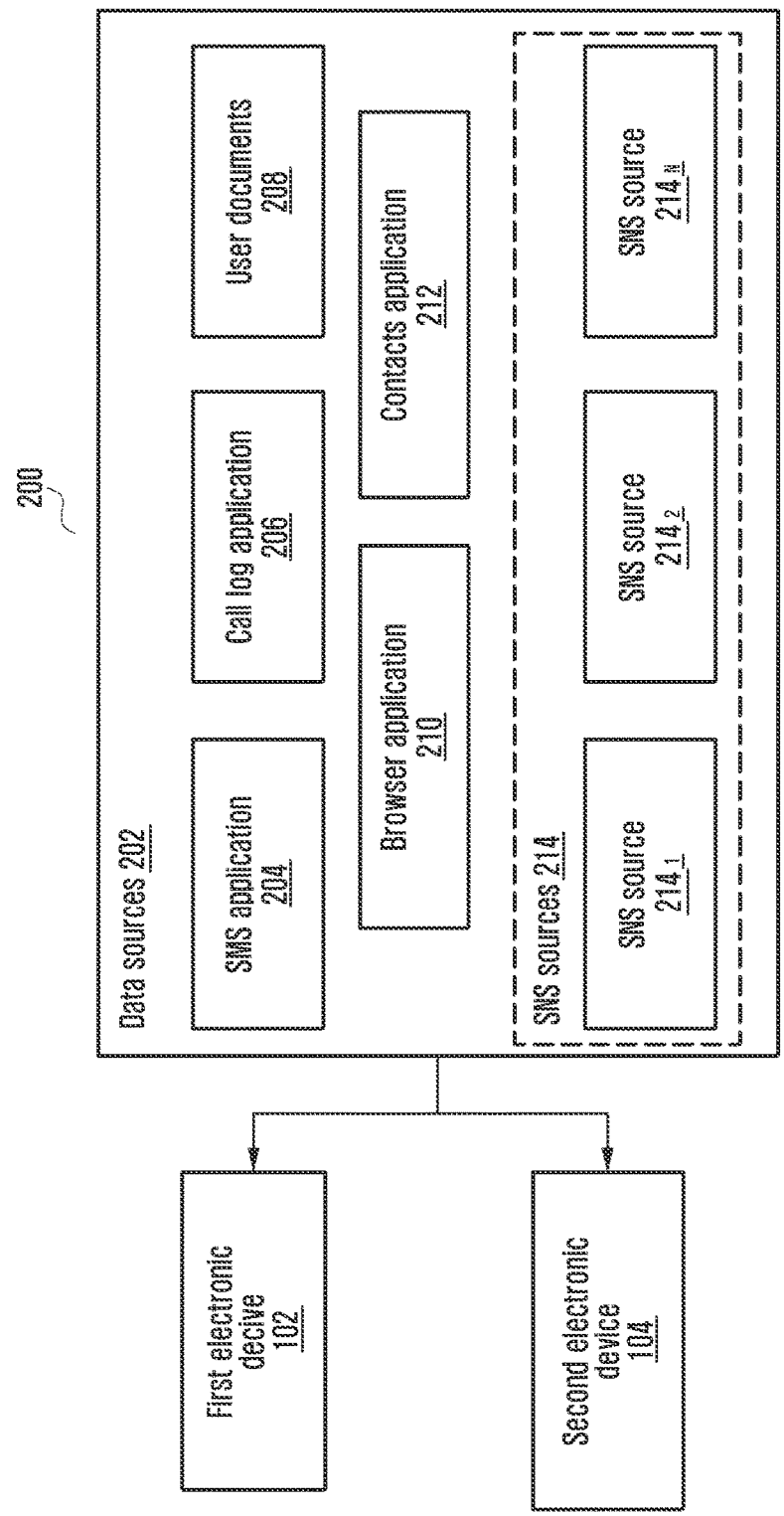
FIG. 2 illustrates another implementation of the system including at least one data source in a first electronic device or a second electronic device for dynamically collating usage information associated with a user according to an embodiment of the present disclosure.

FIG. 2 illustrates another possible implementation of the system 200 including one or more data sources 202 in the first electronic device 102 or the second electronic device 104 for dynamically collating usage information associated with a user according to an embodiment of the present disclosure.

Referring to FIG. 2, the system 200 includes the first electronic device 102, the second electronic device 104, and one or more data sources 202. The data sources 202 can include a SMS application 204, a Call log application 206, user documents 208, a browser application 210, a contacts application 212, and one or more SNS sources 214$_{1-N}$ (hereafter referred as SNS sources 214). In an embodiment, the SNS sources 214 can include, for example but not limited to, an image application, a fan following page application, a Chat application, a Messenger application, user event data, calendar data, user privacy policy data, media data (e.g., photos, or video clips), and the like.

The first electronic device 102 dynamically collates usage information of one or more data sources associated with the first user. The second electronic device 104 dynamically collates usage information of one or more data sources associated with the second user. Further, the usage information of the first user can be dynamically updated for every predetermined amount of time in the first electronic device 102. The usage information of the second user will be dynamically updated for every predetermined amount of time in the second electronic device 104. In an embodiment, the usage information can be for example but not limited to a browser data or browser activity information. The browser data can be for example but not limited to history data associated with any application, any open tabs data, any SMS history data, email data, SNS data, and the like. Unlike conventional systems, the usage information of the first user and the second user from the data sources 202 will be dynamically determined; thereby, automatically categorizing the collected usage information into one or more knowledge clusters.

Figure 3:
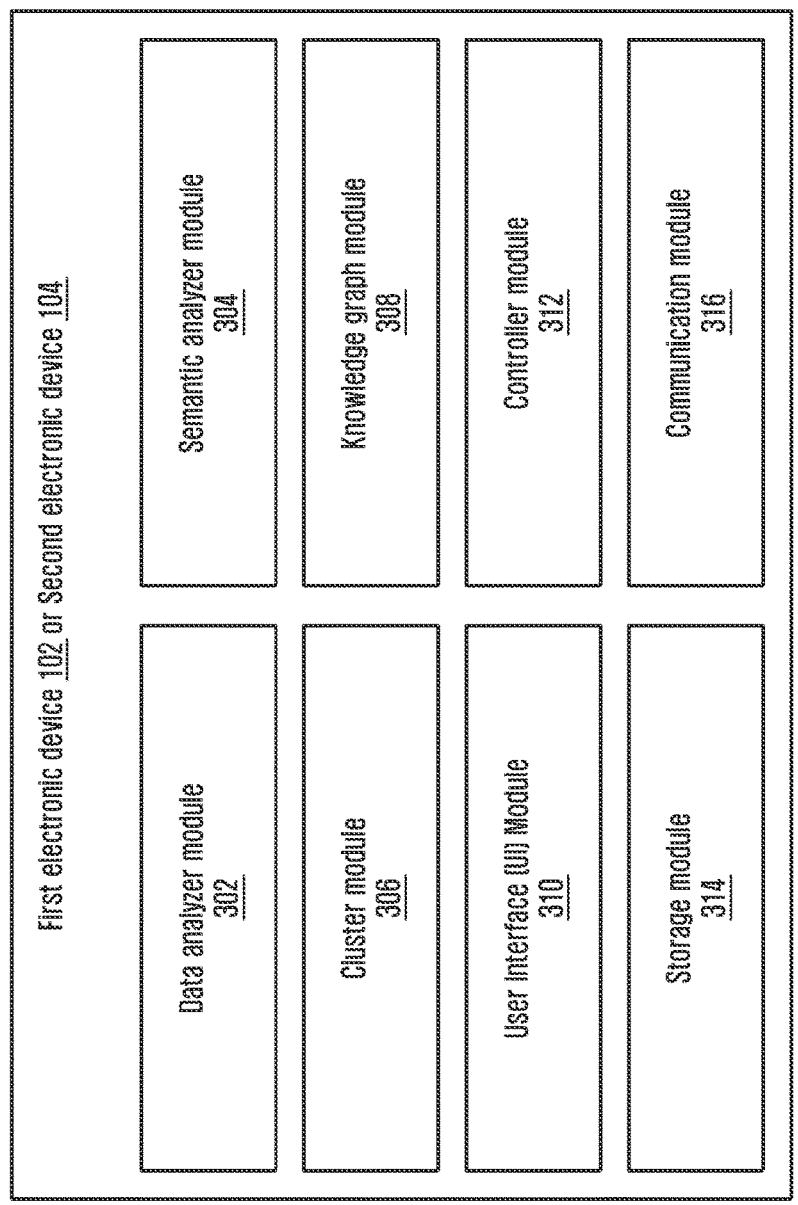
FIG. 3 illustrates various modules of the first electronic device or the second electronic device for dynamically modifying one or more elements of the UI based on the user knowledge graph according to an embodiment of the present disclosure.

FIG. 3 illustrates various modules of a first electronic device 102 or a second electronic device 104 for dynamically modifying one or more elements of a UI based on the user knowledge graph according to an embodiment of the present disclosure.

Referring to FIG. 3, the first electronic device 102 or the second electronic device 104 includes a data analyzer module 302, a semantic analyzer module 304, a cluster module 306, a knowledge graph module 308, a UI module 310, a controller module 312, a storage module 314, and a communication module 316.

The data analyzer module 302 can be configured to collate the usage information of one or more data sources 202 in the first electronic device 102 or the second electronic device 104. In an embodiment, the user's historical data such as browser URL history, browser web-pages, browser feeds, social network updates, and the like are stored in various applications. The data analyzer module 302 can be configured to remove embedded advertisements, repetitive contents (for example, headlines in news webpages that get repeated within the webpage) from the collated usage information of the data sources 202. The data analyzer module 302 can be configured to collect the data associated with the embedded links in the data sources 202. Moreover, if there is no image mentioned in the metadata of any social feed, then the data analyzer module 302 extracts the main image along with the main article from the embedded links to visualize the topics formed in the first electronic device 102 or the second electronic device 104.

The data analyzer module 302 can be configured to send the collated information to the semantic analyzer module 304. On receiving the collated information, the semantic analyzer module 304 extracts the semantic content from the collated usage information of each data source 202 in the first electronic device 102 or the second electronic device 104. In an embodiment, the semantic content includes, for example but not limited to, a word vector, structured data, a topic, a token, etc. In an embodiment, the semantic analyzer module 304 extracts topic word vectors present in a document extracted from each data source 202. A modified version is used where extracted words are combined from web content (after cleaning and morphology) with some existing or pre-loaded web content so as to get a fine grained list of topic models (for LDA refinement) present within a web page. Further, a list of the word vectors depicting each topic present within the web page is displayed. Further, an indexing module which uses keywords (or sets of keywords)

present within each word vector is used to identify an occurrence of each topic in the web page. This would form an index denoting a set of word vectors with corresponding location identifiers within the web page. The index gives information about the specific topic that the user browses at a particular location of the web page.

The semantic analyzer module 304 sends the extracted semantic content to the cluster module 306. On receiving the extracted semantic content, the cluster module 306 can be configured to map the semantic content of each data source 202 to categorize the collated usage information into the knowledge cluster using an incremental model. The detail description of the incremental model for categorizing the collated usage information into the knowledge cluster is explained in conjunction with FIG. 5. The cluster module 306 can be configured to send the knowledge cluster to the knowledge graph module 308. On receiving the knowledge cluster, the knowledge graph module 308 can be configured to correlate the knowledge cluster to form the knowledge graph. The knowledge graph module 308 is configured to depict the usage information in the form of the knowledge graph in the first electronic device 102 or the second electronic device 104.

In an embodiment, dynamic knowledge clusters are converted into knowledge nodes in a knowledge graph. All the knowledge nodes and the links among them are stored as the knowledge graph in the first electronic device 102 or the second electronic device 104. The knowledge nodes are weighted, possibly nonlinearly, to account for the dynamic nature of the user's knowledge. The knowledge graph can be exposed to third parties to build further applications on top of the knowledge graph. Further, the knowledge graph module 308 can be configured to send the knowledge graph to the UI module 310. The UI module 310 can be configured to dynamically modify the element of the UI based on the knowledge graph received from the knowledge graph module 308. The UI module 310 can be configured to dynamically select the knowledge cluster from the knowledge graph, and displays the selected knowledge cluster on the UI based on one or more rules. The details of rules for displaying the knowledge clusters are explained in conjunction with FIG. 4.

In an embodiment, the UI module 310 can be configured to receive a localized query by the second electronic device 104 from a server 112, where the localized query includes the semantic content. The semantic analyzer module 304 computes the semantic similarity between the semantic content and a knowledge graph stored in the second electronic device 104. The UI module 310 displays the recommendation message including data about the second electronic device 102 on the element of the UI of the first electronic device 102.

The controller module 312 can be configured to frequently monitor the usage information of the data sources 202 in the first electronic device 102 or the second electronic device 104. The controller module 312 can be configured to update the knowledge cluster based on the monitoring using the incremental model, where the updating the knowledge cluster includes adding the semantic content to the knowledge cluster or splitting the knowledge cluster or merging the knowledge cluster. The storage module 314 can be configured to store the knowledge graph in the first electronic device 102 or the second electronic device 104. Further, the storage module 304 stores the control instructions and operations which are used to perform various operations described herein. The communication module 316 establishes communication session between various components supported in the first electronic device 102 or the second electronic device 104. In an embodiment, the communication module 316 shares the knowledge graph of the first user associated with the first electronic device 102 with the second user associated with the second electronic device 104 in the knowledge-based assistive network 106. In another embodiment, the communication module 316 shares the knowledge graph of the second user associated with the second electronic device 104 with the first user associated with the first electronic device 102 in the knowledge-based assistive network 106.

The first electronic device 102 and the second electronic device 104 may process, using a processor, data exchanged through the data analyzer module 302, the semantic analyzer module 304, the cluster module 306, the knowledge graph module 308, the UI module 310, the controller module 312, the storage module 314, and the communication module 316. The processor may include at least one of the data analyzer module 302, the semantic analyzer module 304, the cluster module 306, the knowledge graph module 308, the UI module 310, the controller module 312, the storage module 314, and the communication module 316. The first and second electronic devices 102 and 104 may display the data processed through the processor on a display. In an embodiment, the first and second electronic devices 102 and 104 may process UI data through the UI module 310 using the processor and then display the processed data on the display under the control of the processor.

The first and second electronic devices 102 and 104 may include a touch sensitive unit through which a user input (e.g., a user's touch input) can be received.

The FIG. 3 show a limited overview of the first electronic device 102 or the second electronic device 104 but, it is to be understood that other embodiment is not limited thereto. Further, the first electronic device 102 or the second electronic device 104 can include any number of modules communicating among each other along with the other components of the system 100.

Figure 4:
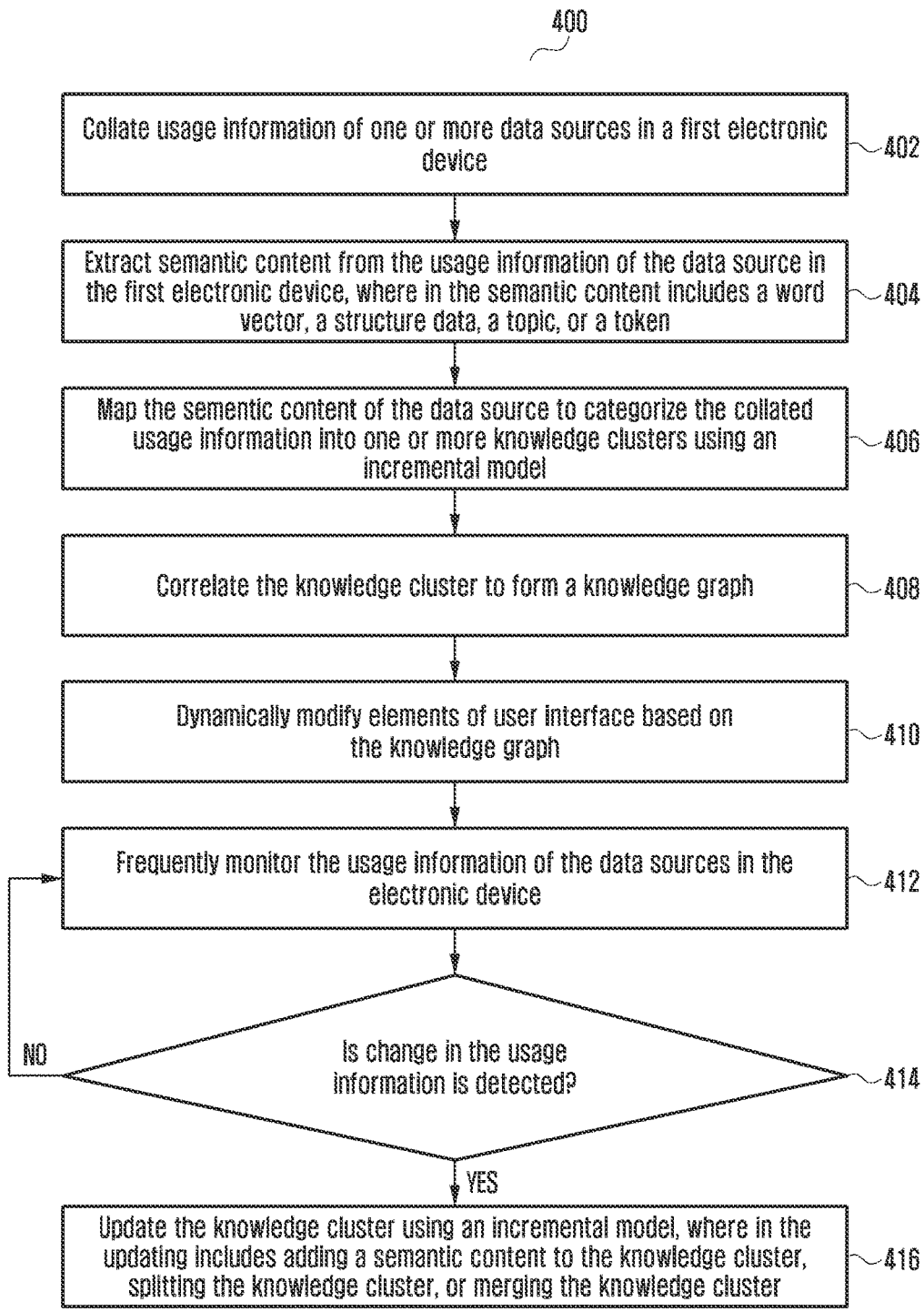
FIG. 4 is a flow diagram illustrating a method for dynamically modifying one or more elements of a UI of an electronic device based on the knowledge graph according to an embodiment of the present disclosure.

FIG. 4 is a flow diagram illustrating a method 400 for dynamically modifying one or more elements of a UI of an electronic device based on the knowledge graph according to an embodiment of the present disclosure. In an embodiment, the electronic device described herein can be for example but not limited to the first electronic device 102 or the second electronic device 104.

At operation 402, the method 400 includes collating usage information of the data sources 202 in the electronic device. The method 400 allows the data analyzer module 302 to collate the usage information of the data sources 202 in the electronic device. In an embodiment, the usage information for example but not limited to a browsing history, a SNS information, application usage data, and the like. At operation 404, the method 400 includes extracting the semantic content from the usage information of the data sources 202 in the electronic device, where the semantic content includes a word vector, a structure data, a topic, or a token. In an embodiment, the token can be, for example but not limited to, a keyword or a URL. The method 400 allows the semantic analyzer module 304 to extract the semantic content from the usage information of the data sources 202 in the electronic device, where the semantic content includes a word vector, a structure data, a topic, or a token.

At operation 406, the method 400 includes mapping the semantic content of the data sources 202 to categorize the collated usage information into the knowledge clusters using an incremental model. The method 400 allows the cluster module 306 to map the semantic content of the data sources

202 to categorize the collated usage information into the knowledge clusters using the incremental model. At operation 408, the method 400 includes correlating the knowledge cluster to form the knowledge graph. The method 400 allows the knowledge graph module 308 to correlate the knowledge cluster to form the knowledge graph. At operation 410, the method 400 includes dynamically modifying the elements of the UI based on the knowledge graph. Unlike conventional systems, the method 400 allows the UI module 310 to dynamically modify the elements of the UI based on the knowledge graph. In an embodiment, the elements can be, for example but not limited to, camera controls, browser content display, applications UI, providing recommendations, and the like.

In an embodiment, dynamically modifying the elements of the UI based on the knowledge graph includes dynamically selecting the knowledge cluster from the knowledge graph. The selected knowledge cluster is displayed on the UI based on one or more rules (i.e., visual rules). The one or more visual rules are described below:

Cluster size—driven by the number of URLs present in the knowledge cluster.

Maximum size (i.e., in case of 1 cluster only)—to span across the width of the page leaving padding's on either side.

Maximum size (in case of 2 clusters only)—the larger cluster to span across the width of the page (leaving padding on either side) and the smaller cluster to be a percentage of the former's size.

Maximum size (in case of 3 clusters)—in line with the above rules.

Maximum size (in case of more than 3 clusters)—fit the minimum 2 clusters (maximum 3 clusters) in a row and thereby, define the largest cluster size, smaller clusters being percentages of the largest cluster.

Align clusters in center with respect to the vertical axis. Leave constant padding (as per guidelines) between clusters (vertically+horizontally), and equal space on the left and right edges of the UI.

Topic Clusters page vertically scrollable.

Topic Clusters in the order of most recent, from the top to bottom.

Cluster image: Top image (best resolution, most relevant, etc.) of most recent URL. In case none is found, check next most recent URL for the image.

Page background image: Top image from the largest cluster. If none is found, check the second largest cluster. The image may be blurred slightly to make it non-intrusive with respect to the foreground (clusters).

A user's touch input (or a touch interaction) on the cluster may scroll it to the center of the page, and the page may split from the center of the touched cluster and show URLs within the cluster. Additionally, when a user's touch input (or a touch interaction) on an upper cluster is received, the content of a lower cluster may be shown. Similarly, when a user's touch input (or a touch interaction) on a lower cluster is received, the content of an upper cluster may be shown.

Tapping a cluster may scroll it vertically to the center of the page, and the page may split from the center of tapped cluster and show URLs within the cluster.

List view of URLs may be vertically scrollable inside a constant split space. A user's touch input (e.g., tap or pinch zoom-in) outside the split space or hitting the back key may close the list view (the split space closes from the center) and return to the topic clusters view.

In another embodiment, dynamically modifying the elements of the UI based on the knowledge graph may include receiving a localized query by the second electronic device 104 from the server 112, where the localized query includes the semantic content. A semantic similarity between the semantic content and the knowledge graph stored in the second electronic device 104 is computed and a recommendation message including the data stored in the second electronic device 104 is displayed on the element of the UI of the first electronic device 102, based on the semantic similarity.

At operation 410, dynamically modifying the UI elements displayed on the electronic device may include dynamically modifying the UI elements in response to a touch interaction based on a user's touch input through a touch sensitive unit contained in the electronic device.

At operation 412, the method 400 includes frequently monitoring the usage information of the data sources 202 in the electronic device. The method 400 allows the controller module 312 to frequently monitor the usage information of the data sources 202 in the electronic device. If it is determined at operation 414 that a change in the usage information is detected then at operation 416 the method 400 includes updating the knowledge cluster using the incremental model, where the updating includes adding the semantic content to the knowledge cluster, splitting the knowledge cluster, or merging the knowledge cluster. The method 400 allows the controller module 312 to update the knowledge cluster using the incremental model, where the updating includes adding the semantic content to the knowledge cluster, splitting the knowledge cluster, or merging the knowledge cluster. If it is determined at operation 414 that the change in the usage information is not detected, then at operation 412 the method 400 includes frequently monitoring the usage information of the data sources 202 in the electronic device. The method 400 allows the controller module 312 to frequently monitor the usage information of the data sources 202 in the electronic device.

The various actions, acts, blocks, operations, and the like in the method 400 may be performed in the order presented, in a different order, or simultaneously. Further, in various embodiments, some actions, acts, blocks, operations, and the like may be omitted, added, modified, skipped, and the like without departing from scope of the disclosure.

In the method 400 the monitored cluster may be displayed as the UI elements through the display of the electronic device.

Figure 5:
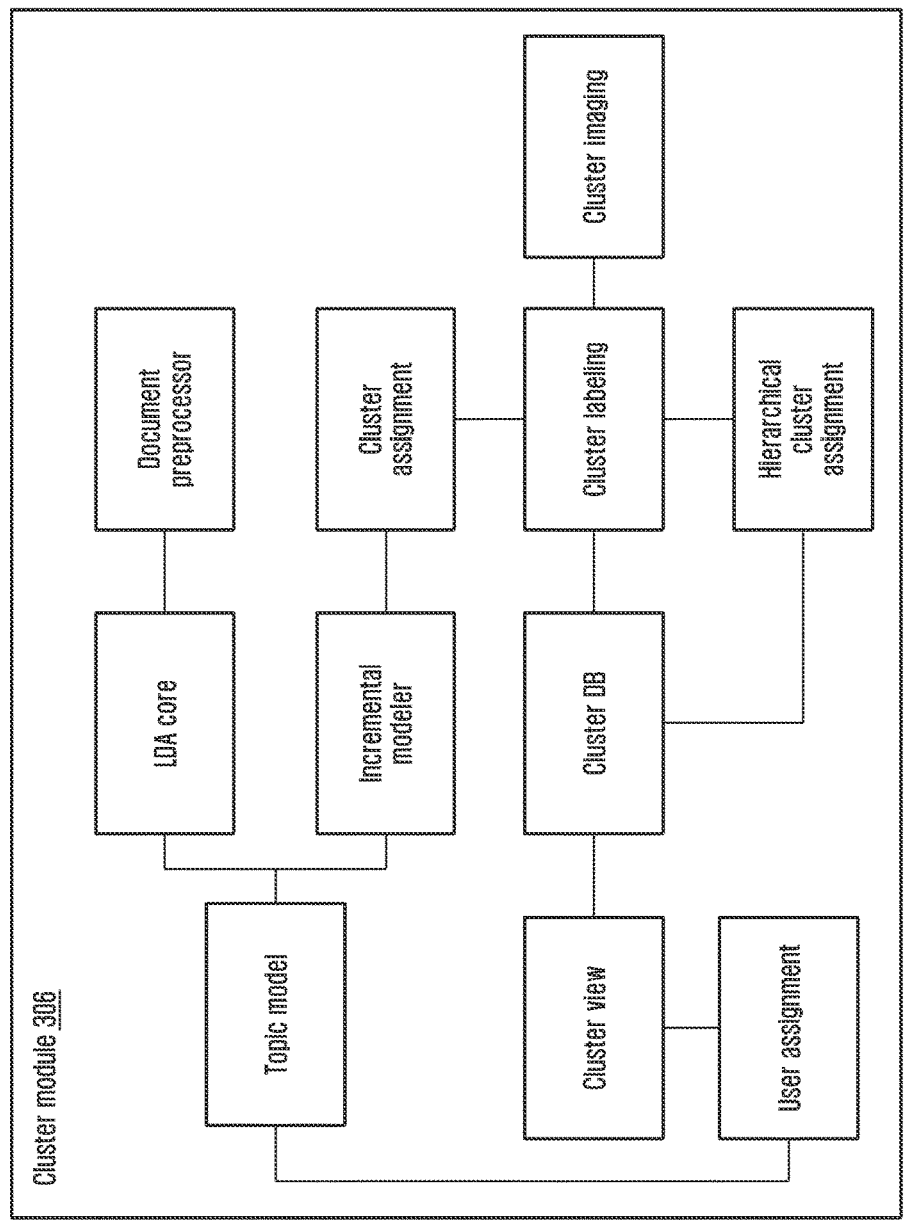
FIG. 5 illustrates various components of a cluster module according to an embodiment of the present disclosure.

FIG. 5 illustrates various components of a cluster module 306 according to an embodiment of the present disclosure.

Referring to FIG. 5, a topic model is first constructed by cluster module 306 from pre-loaded topic specific documents. The topic model further gets updated based on the topics/URLs that the user browses using the electronic device. In an embodiment, the electronic device can be the first electronic device 102 or the second electronic device 104. The pre-loaded topic specific documents may be masked from the user and are used in constructing the initial topic model. Unlike conventional LDA modeling methods where full topic models are always constructed, incremental modeling is used, which results in updating the topic model whenever the user browses new topics or URLs. There is no need to save full word corpus, as there is no need to construct a full LDA model from a starting point. Instead, only the topic word vectors (i.e., word vectors that define topics along with their probability values) are stored. By using the incremental modeling, the resources, including both battery and memory usage of the electronic device, can be reduced.

When the user browses to a URL, if the browsed URL gets qualified as article text i.e., contains a minimum amount of text, then the clustering process is initiated. After the removal of stop words from the URL (i.e., stemming occurs inside the LDA module), the word corpus is sent to the LDA model. Typically, the LDA based clustering process may not be engaged immediately after browsing, but a simple distance matching (Cosine) may be employed to do an immediate match with the pre-loaded knowledge cluster in the electronic device to save battery power. The clustering model 306 waits for 1-N (e.g., 5 URLs) URLs to be browsed by the user before initiating the clustering process. In an embodiment, the clustering process is also performed against the pre-loaded topic models and the changes to the pre-loaded topic vectors due to the addition of new URLs browsed by the user are also updated. During the process of cluster assignment, the document-topic map is used in the clustering process. The top topic distributions within the documents are used in deciding which cluster the browsed URLs may belong to. The match is performed based on the cosine or other distance metric between the document topic vector and the topic vector of the pre-loaded cluster models in the electronic device. If it is determined that the match is not within a specific threshold, then a new knowledge cluster for the documents can be created for the user in addition to the pre-loaded knowledge clusters.

In an embodiment, based on the addition of the new documents in the pre-loaded knowledge clusters and the new knowledge clusters formed based on the newly browsed URLs by the user, the cluster label for the knowledge cluster gets updated. The cluster label also has the word vector assignment, but only specific tokens from the vector are taken for labeling the knowledge cluster. The detailed description of the cluster labeling process is explained in conjunction with FIG. 6. After the process of cluster labeling, an image from the leading document (i.e., a most relevant document to the topic) is taken as the cluster background for the knowledge cluster. The URLs in the knowledge cluster are placed based on the relevance rather than the timeline. The URL may belong to one or more knowledge clusters based on its degree of relevance above the certain threshold. The knowledge clusters, along with the title vectors, URLs and the cluster image are stored in the cluster specific database (db) as shown in FIG. 5.

In an embodiment, for the multi-level clustering (i.e., clusters within a knowledge cluster), the cluster label vectors are used for determining the relations. Here, the content topics models are not used and based on the topic relations parent-child-sibling relations are established between the clusters. The parent-child-sibling relations hierarchy of the cluster is stored in the cluster database through the process of matching and merging. The cluster viewer receives the knowledge clusters directly from the cluster db based on the user action for rendering on the UI of the electronic device.

In an embodiment, the user can modify the cluster definitions by sending the URLs from one cluster to another cluster. In another embodiment, the user can also create a new cluster with a cluster label and send the URLs from the existing cluster to the new cluster. Once the URLs are sent, the cluster definition is automatically updated so that any new user browsed URLs matching with the URLs of the cluster will be automatically updated to the new cluster unless again changed by the user. The image extraction for the cluster background is initiated if the user sends new URLs to the cluster. The user can also move up the relevancy of the URL by changing its position within the cluster.

In an embodiment, the incremental clustering and hybrid clustering process are explained below:

Incremental clustering: In the conventional LDA method, sampling performed on a whole corpus size of example, 300 URLs with 2000 iterations with 25 topics, took approximately 6 minutes to complete. As the user history data increases over time, the algorithm time is increased by an exponential factor and it becomes very difficult to run the algorithm natively on the client electronic device. In order to decrease the run time, the incremental clustering process is implemented that achieves significant improvement in reducing the run time of the algorithm.

Incremental Process:

Load the previous saved knowledge cluster model;

Do multinomial sampling on a new set of URLs article data, based on the previous knowledge cluster model;

Based on the number of words assigned to a topic and the frequency of the words, the semantic similarity is computed between the article URLs and the topics;

A new cluster model is generated at the end of the process;

Append the new cluster model to the previously loaded knowledge clusters; and

Save the new cluster model.

Unlike conventional systems, the incremental clustering process requires pre-loaded cluster models for initiating the clustering process on the specific topics. The incremental clustering process saves the battery power of the electronic device. As the process is fully run on the electronic device, an Integrated Circuit (IC) provides significant advantage in resource savings.

Hybrid clustering: In the hybrid clustering process, a set of top level topics are identified (e.g., 15 top topics such as Sports, Health, Politics, Culture and Art, Media, etc.) and cluster models are constructed for the topics by crawling web pages related to the topics. In addition to the top topic clusters, there will be another cluster called "Others" where any URL that does not map into the supervised topics will be accumulated. All the primary clusters will also have a sub-cluster called "Others". The behavior of "Others" sub-cluster is the same whether at the primary level or at the sub-cluster level. If the number of URLs that map into the "Others" category exceeds above a preset number (e.g., 20) then the unsupervised LDA is triggered on the content providing an estimation of number of topics. The LDA requires how many topics are present in the content and to understand how many topics are present, a density based approach has been used. A density based approach tries to group a document that has more relevance to other documents and at the end; it returns the expected number of groups that needs to be formed.

Then, the LDA is run on the "others" category with the number of topics to generate new clusters. The new clusters are formed with the content inside "Others" and the new clusters are added outside the "Others" cluster. So, the new clusters will emerge either at the primary level or at the sub-cluster level. The new cluster is appended to the existing model so that entry is made for the new cluster for incremental modeling. So the next time a new URL is browsed by the user, the cluster definition (or topic mapping) is also taken into account to check to which cluster the new URL belongs.

In an embodiment, multiple smaller cluster models in the hybrid mode are maintained. In an embodiment, each primary category will also maintain its own incremental model related to its sub-clusters. Unlike conventional systems, only content inside the "Others" category is maintained until the content inside "Others" gets triggered for clustering, after which the content can also be removed, thereby resulting in space savings.

Figure 6:
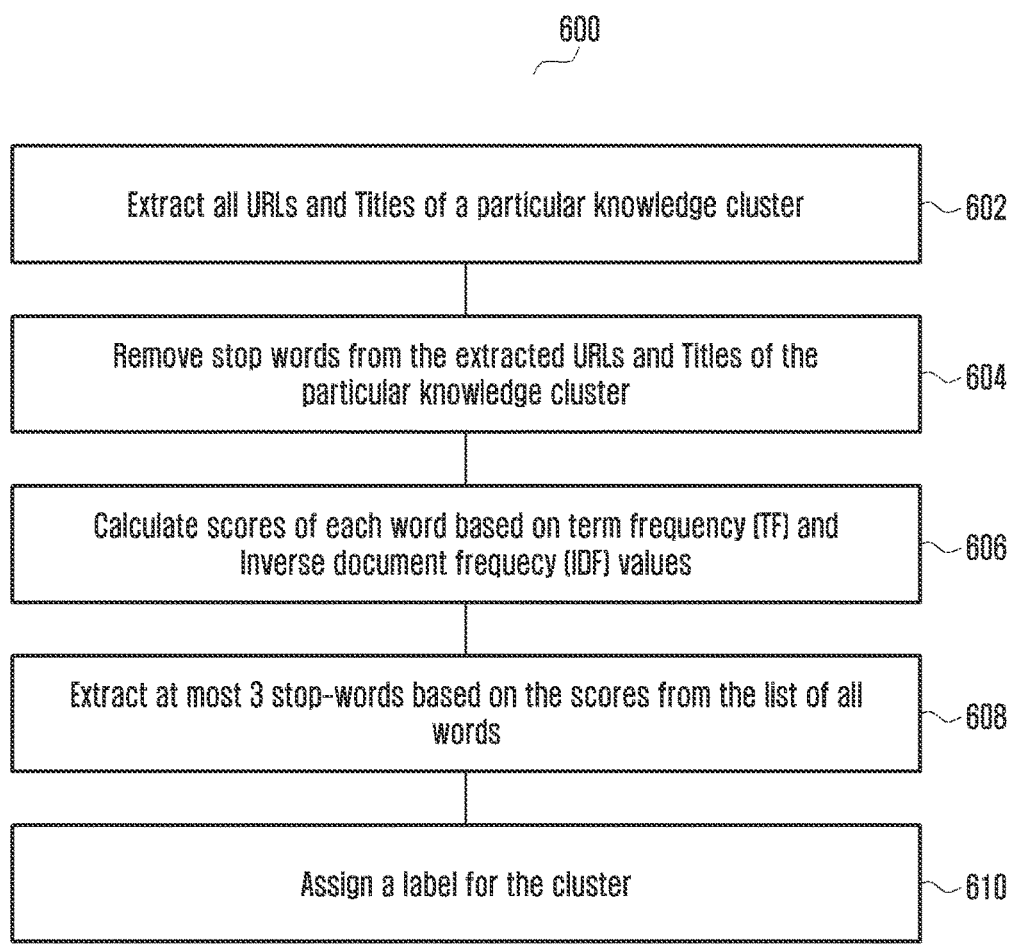
FIG. 6 is a flow diagram illustrating a method for labeling a cluster according to an embodiment of the present disclosure.

FIG. 6 is a flow diagram illustrating a method 600 for labeling a cluster, according to an embodiment of the present disclosure.

At operation 602, the method 600 includes extracting all the URLs and titles of the particular knowledge cluster. The method 600 allows the cluster module 306 to extract all the URLs and titles of the particular knowledge cluster. At operation 604, the method 600 includes removing stop words from the extracted URLs and titles of the knowledge cluster. The method 600 allows the cluster module 306 to remove the stop words from the extracted URLs and titles of the knowledge cluster. At operation 606, the method 600 includes calculating scores of each word based on a term frequency (TF) and an Inverse Document frequency (IDF) values. The method 600 allows the cluster module 306 to calculate the scores of each word based on the TF and the IDF values. At operation 608, the method 600 includes extracting at most a predetermined number, e.g., 3, stop words based on the scores from the list of all the words. The method allows the cluster module 306 to extract the predetermined number or more top words based on the scores from the list of all the words. At operation 610, the method 600 includes assigning a label for the knowledge cluster. The method 600 allows the cluster module 306 to assign the label for the knowledge cluster.

In an embodiment, a topic or cluster labeling process is performed based on the content that forms the knowledge cluster. There are several methods to perform the cluster labeling.

One of the traditional methods is to find the information entropy of each word in topic vectors that define the cluster to be constructed, and choose a most suitable contributor as a label.

Another traditional method is to use the label using key statistics, e.g., centroid, etc.

Unlike conventional systems, a distance-based method is used for cluster labeling. The cluster labeling process is described below:

Dataset:
Word tokens in the URL excluding domain names; and
Title token sets and weight of each document in topic.
Cluster Labeling Process:
Tokenize all the words extracted from all the URLs, titles from each cluster.
Remove stop-words from the obtained words.
Create a label vector from the remaining words with word and corresponding score. Score calculation for a word=Σ (term frequency of word in a cluster/Inverse document frequency for that word); term frequency of word in the cluster=Σ (term frequency of word in a particular URL*weight of the URL/normalization factor of URL); normalization factor of URL=Σ (term frequency*term frequency) for each word in that URL.
Generate Labels from the label vector formed by considering top-10 words in descending order of scores.

Unlike conventional systems, the titles are considered because it carries the essence of the document. It conveys the meaning of the document in one line so that the end user can recognize the cluster if the words are present. The URL words other than domain are considered because most websites attempt to store documents in an ordered format such as "domain_name/sports/iref=" or "domain_name/news/health_ref=" thereby, capturing to which topic the document belongs. Also, the weights of the documents are used to capture the relevance of the document in the knowledge cluster. Here, "TF/IDF" are used instead of "TF*IDF" because "IDF" is the normalization factor which is used to normalize the words that occur more number of times across the corpus in case of search engines, "TF/IDF" is used because words which occurred more number of times are needed as that word is more likely the label of that particular cluster.

The various actions, acts, blocks, operations, and the like in method 600 may be performed in the order presented, in a different order or simultaneously. Further, in various embodiments, some actions, acts, blocks, operations, and the like may be omitted, added, modified, skipped, and the like without departing from scope of the disclosure.

Figure 7:
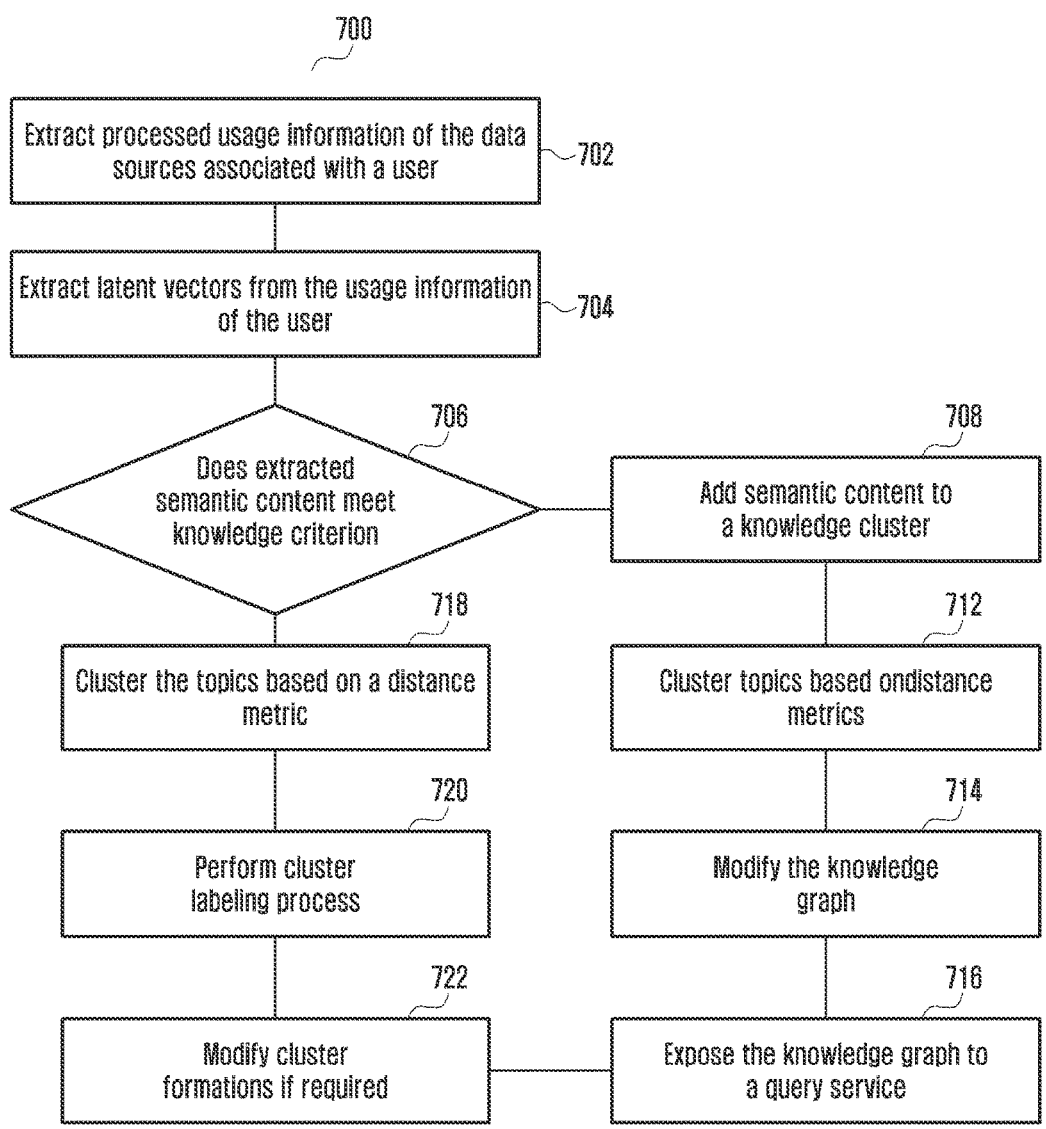
FIG. 7 is a flow diagram illustrating a method to dynamically modify a knowledge graph in a first electronic device or a second electronic device according to an embodiment of the present disclosure.

FIG. 7 is a flow diagram illustrating a method 700 to dynamically modify a knowledge graph in a first electronic device 102 or a second electronic device 104 according to an embodiment of the present disclosure.

At operation 702, the method 700 includes extracting the processed usage information of the data sources 202 associated with the user. The method 700 allows the data analyzer module 302 to extract the processed usage information of the data sources 202 associated with the user. At operation 704, the method 700 includes extracting latent vectors (i.e., semantic content) from the usage information of the user. The method 700 allows the semantic analyzer module 304 to extract the latent vectors from the usage information of the user.

If it is determined at operation 706 that the extracted semantic content from the usage information meets with the knowledge criterion is detected then at operation 708, the method 700 includes adding the semantic content to the knowledge cluster. The method 700 allows the cluster module 306 to add the semantic content to the knowledge cluster. At operation 712, the method 700 includes clustering the topics based on the distance metrics. The method 700 allows the cluster module 306 to cluster the topics based on the distance metrics. At operation 714, the method 700 includes modifying the knowledge graph. The method 700 allows the controller module 312 to modify the knowledge graph. At operation 716, the method 700 includes exposing the knowledge graph to a query service. The method 700 allows the controller module 312 to expose the knowledge graph to the query service.

If it is determined at operation 706 that the extracted semantic content from the usage information does not meet with the knowledge criterion then at operation 718, the method includes clustering the topics based on the distance metrics. The method 700 allows the cluster module 306 to cluster the topics based on the distance metrics. At operation 720, the method 700 includes performing the cluster labeling process. The method 700 allows the cluster module 306 to perform the cluster labeling process. At operation 722, the method 700 includes modifying the cluster formations if required. The method 700 allows the cluster module 306 to modify the cluster formations if required.

The various actions, acts, blocks, operations, and the like in the method 700 may be performed in the order presented, in a different order or simultaneously. Further, in various embodiments, some actions, acts, blocks, operations, and the like may be omitted, added, modified, skipped, and the like without departing from scope of the disclosure.

Figure 8:
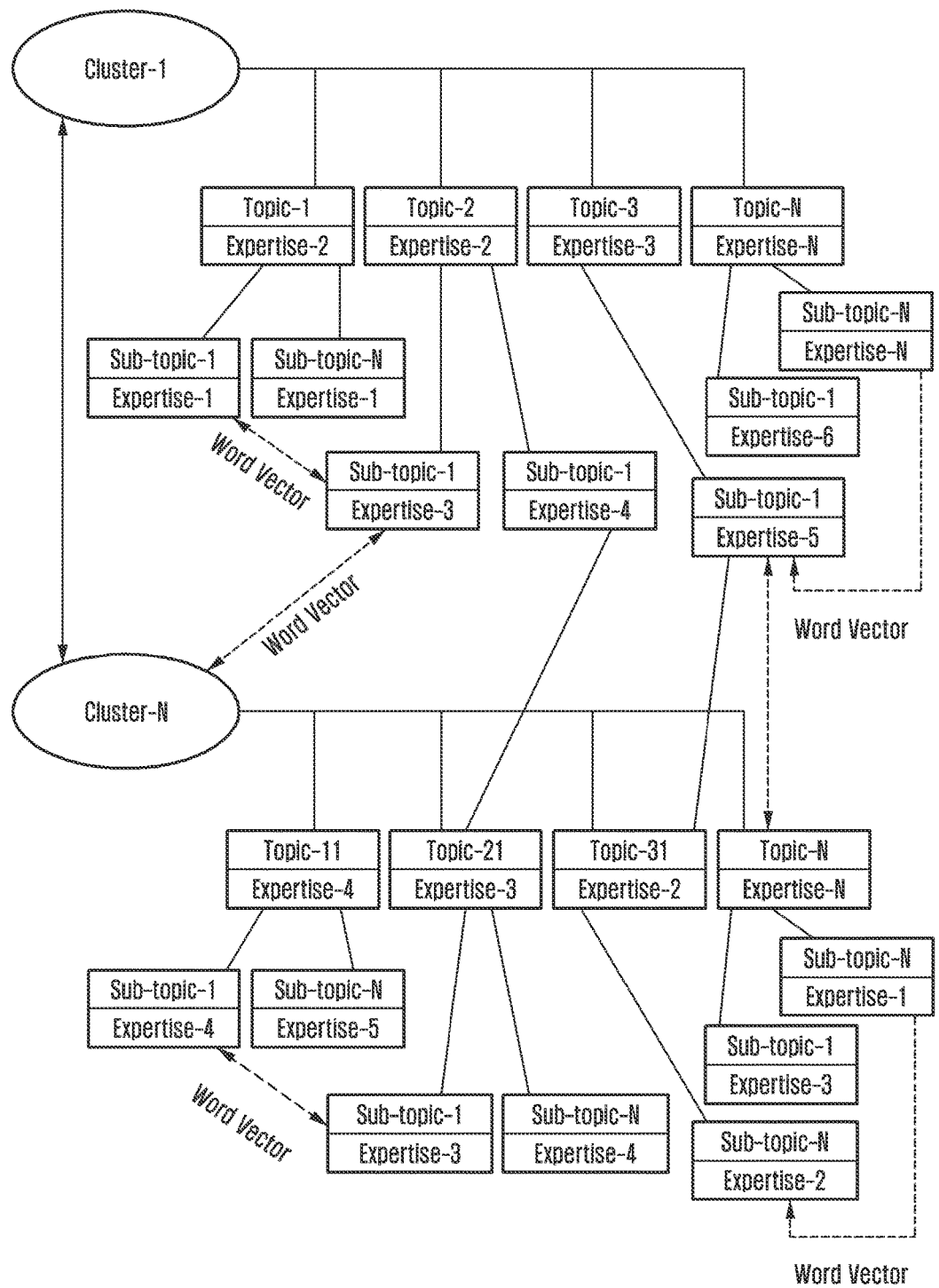
FIG. 8 illustrates a generic representation of a knowledge graph stored in a first electronic device or a second electronic device according to an embodiment of the present disclosure.

FIG. 8 illustrates a generic representation of a knowledge graph stored in a first electronic device 102 or a second electronic device 104 according to an embodiment of the present disclosure.

Referring to FIG. 8, the knowledge graph has a plurality of clusters from 1-N that depict the topic of interest or domain knowledge. Further, each of the knowledge clusters includes one or more topics and sub-topics with different expertise-level indicated for each topic and sub-topic. Further, the keywords identified within the topic and the sub-topic can be used to determine one or more word vectors for the knowledge graph. For example, Cluster-1 and Cluster-N are the knowledge clusters identified in the knowledge graph and each of these clusters includes the topics such as Topic-1, Topic-2, Topic-3, and so on. Further, each of these topics includes sub-topics such as Sub-topic-1, Sub-topic-2, Sub-topic-3, and so on. Further, each of the topics and sub-topics are indicated with different expertise levels including Expertise-1, Expertise-2, Expertise-3, and so on. Further, the dotted line connecting different topics and sub-topics indicate word vectors in the knowledge graph. For example, the cluster-1 can depict the domain knowledge on the topic Politics and the cluster-N can depict the domain knowledge on the topic Science. Further, each of the clusters (Politics and Science) might include the topics office politics, government politics and physics, and chemistry, respectively. Further, each of the topics might include the sub-topics such as metaphysics, nanotechnology, organic chemistry, metallurgy, or the like. Further, each of these topics and sub-topics can be associated with an expertise-level.

Figure 9:
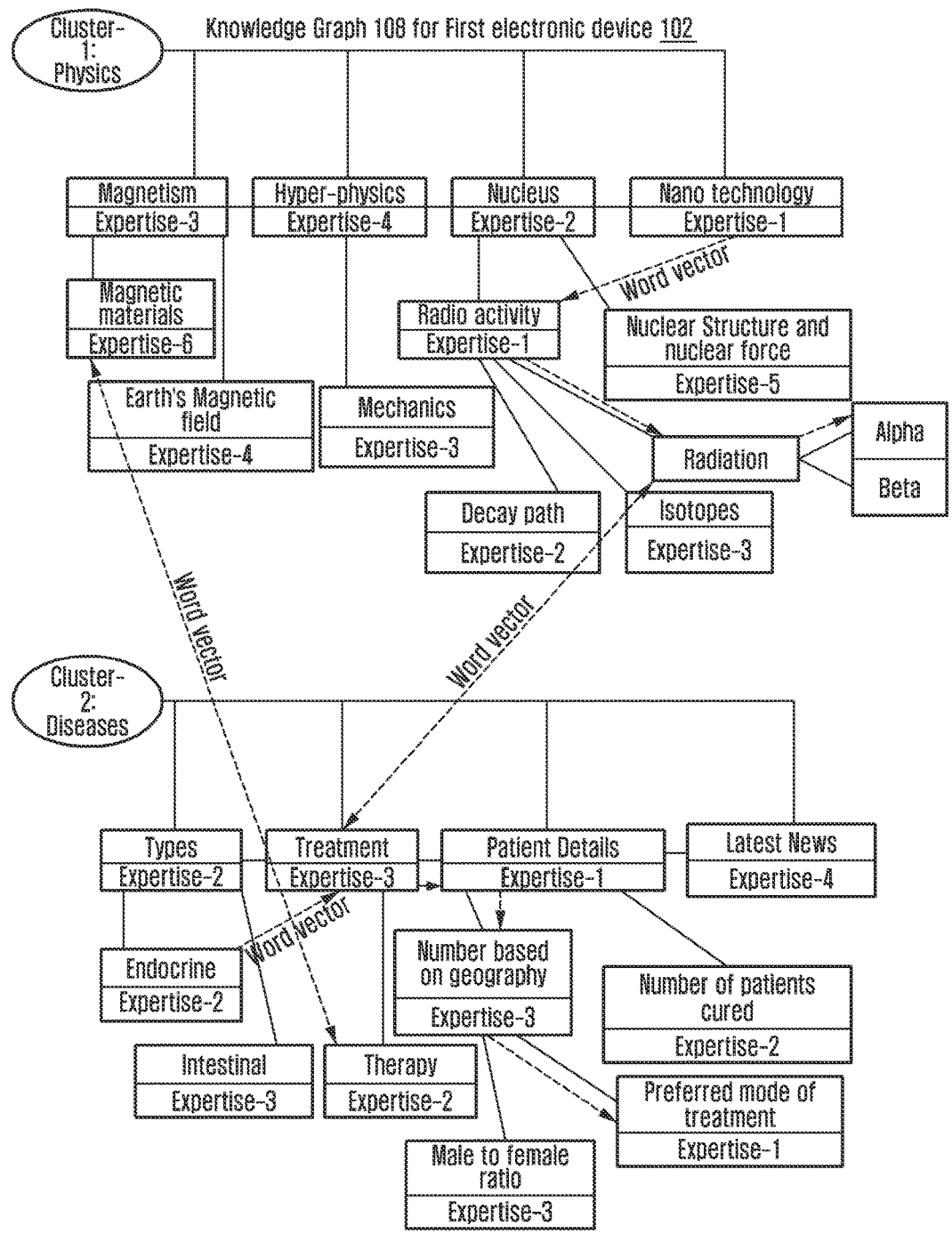
FIG. 9 shows an example illustration representing a knowledge graph in a first electronic device associated with a first user's knowledge in one or more domains according to an embodiment of the present disclosure.

FIG. 9 shows an example illustration representing a knowledge graph 108 in a first electronic device 102 associated with a first user's knowledge in one or more domains according to an embodiment of the present disclosure.

Referring to FIG. 9, the first electronic device 102 has the knowledge graph 108 having two clusters such as cluster-1: physics and cluster-2: diseases. The two clusters indicate that the first user associated with the first electronic device 102 has knowledge in physics and disease domains. The physics cluster might include topics such as Magnetism, Hyper-physics, Nucleus, and Nanotechnology. Further, each of these topics might include sub-topics such as Magnetic materials, Earth's magnetic field, Mechanics, Radio-activity, Radiation, Nuclear structure and nuclear force, Decay path, and Isotopes. Further, each of these topics and sub-topics may be indicated with different expertise levels. The disease cluster may include topics such as types of diseases denoted as Types, Treatment details for the disease denoted as Treatment, Patient details for the type of the disease denoted as Patient details, and latest news about the disease denoted as Latest news. Further, each of these topics may be associated with sub-topics such as Endocrine, Intestinal, Therapy, Number based on geography, Male to female ratio, Number of patients cured, and Preferred mode of treatment. Further, each of the topics and sub-topics may be assigned with different expertise levels. Further, word vectors may be created between two sub-topics considered fewer than two different clusters and word vectors may be created within the same cluster for different keywords. For example, one of the word vectors shown in the knowledge graph 108 can be interpreted as a therapy treatment for a disease using magnetic materials. Another word vector shown in the knowledge graph 108 can be interpreted as a treatment for a disease based on radiation. The word vector connects topics, sub-topics, keywords within the cluster or two different clusters and provides contextual information for the user.

Figure 10A:
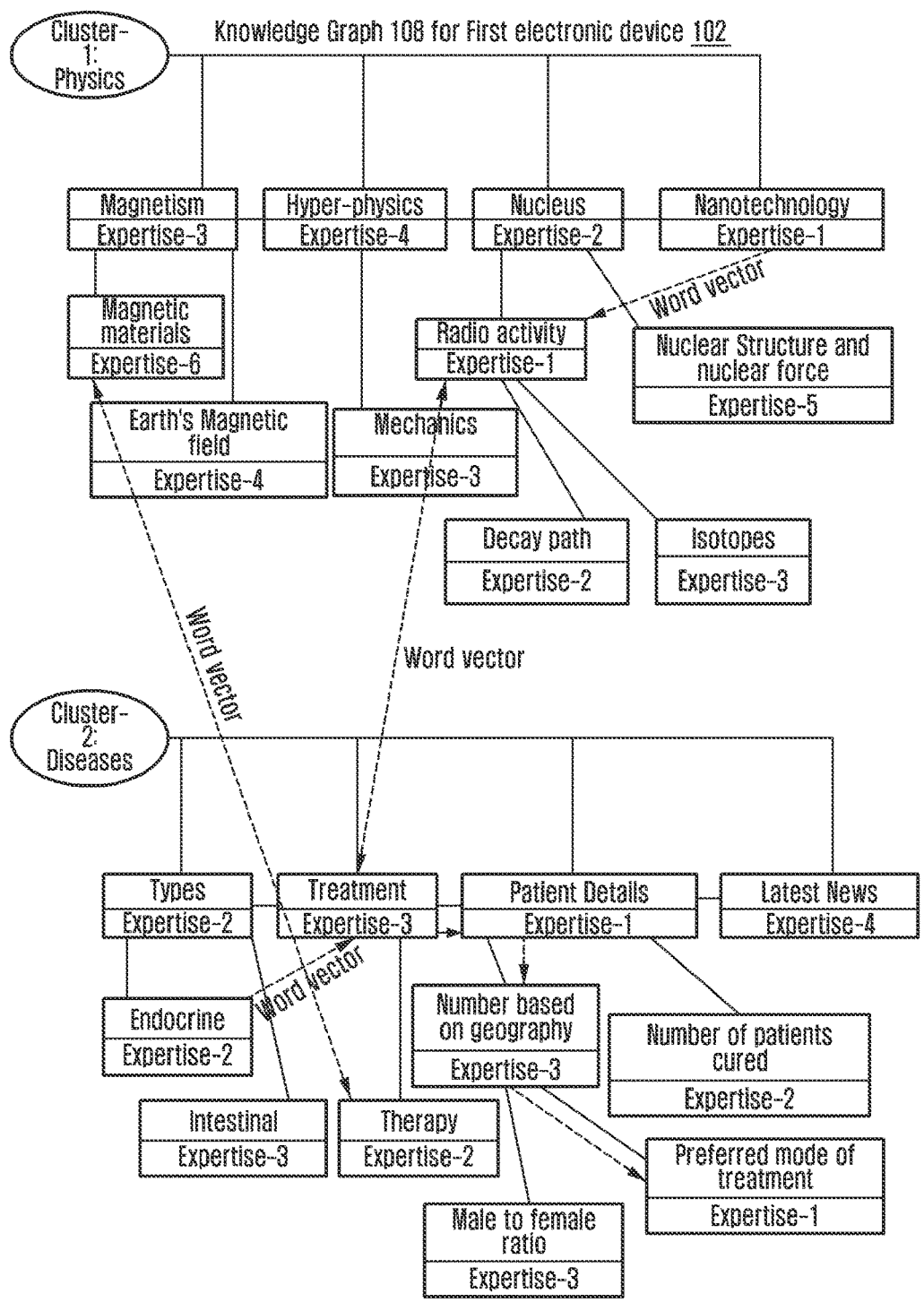
FIGS. 10A and 10B are examples illustration of determining difference in information associated with a knowledge graph stored in a first electronic device and a knowledge graph stored in a second electronic device according to various embodiments of the present disclosure.
Figure 10B:
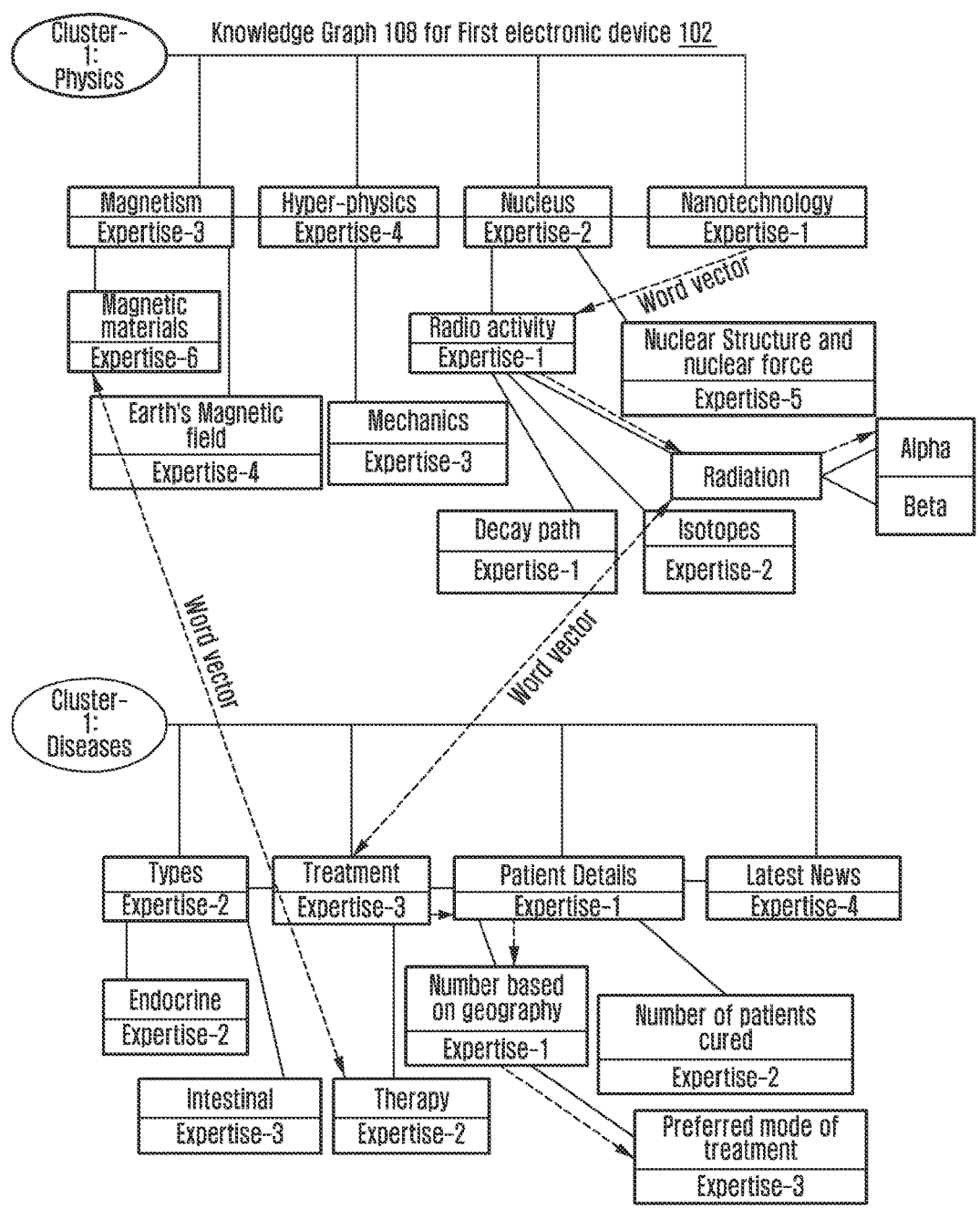

FIGS. 10A and 10B are examples illustration of determining difference in information associated with a knowledge graph 108 stored in a first electronic device 102 and a knowledge graph 110 stored in a second electronic device 104 according to various embodiment of the present disclosure.

FIG. 10A depicts the knowledge graph 108 stored in the first electronic device 102. The knowledge graph 108 includes two clusters Physics and diseases depicting a domain knowledge that pertains to the first electronic device 102. Further, the knowledge graph 108 indicates that the first electronic device 102 has higher expertise level in Radio activity. Further, the knowledge graph 108 includes another cluster disease which has a sub-topic male to female ratio under the sub-topic number based on geography.

FIG. 10B depicts the knowledge graph 110 stored in the second electronic device 104. The knowledge graph 110 includes the clusters physics and diseases depicting the domain knowledge of the second electronic device 104. Further, the knowledge graph 110 indicates that the second electronic device 104 has less expertise level in the radio activity as compared to the expertise level indicated in the first electronic device 102 for the same radio activity. Further, the knowledge graph 108 depicted in the first electronic device 102 containing disease as a cluster does not have a sub-topic male to female ratio under the sub-topic number based on geography. Hence, the knowledge graph 108 stored in the first electronic device 102 and the knowledge graph 110 stored in the second electronic device 104 depict same domain knowledge. However, the expertise level and the level of information provided at different levels vary in the first electronic device 102 and the second electronic device 104 respectively.

Figure 11:
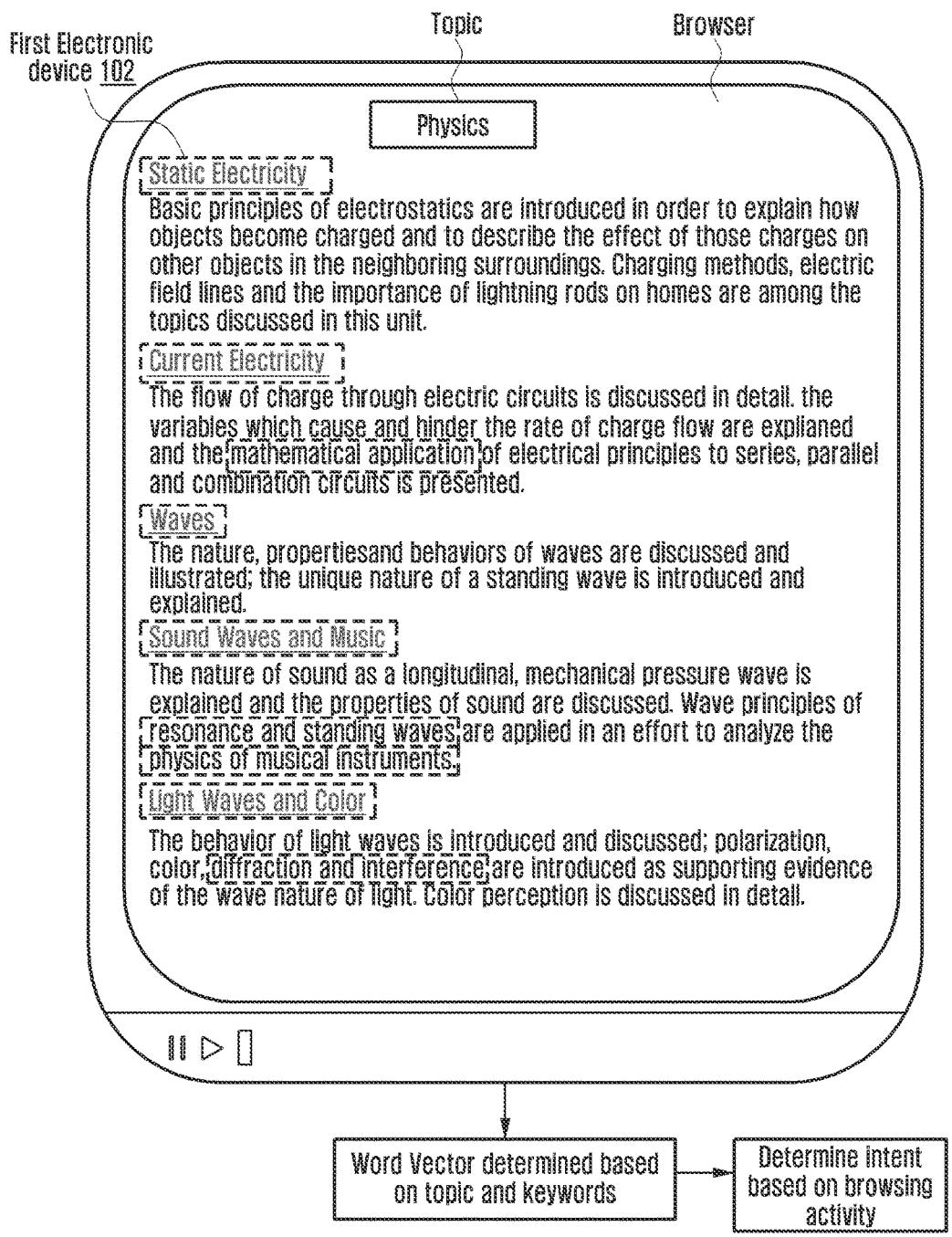
FIG. 11 is an example illustration of determining an implicit intent of the first user while browsing the data on a first electronic device according to an embodiment of the present disclosure.

FIG. 11 is an example illustration of determining an implicit intent of the first user while browsing the data on a first electronic device 102 according to an embodiment of the present disclosure.

Referring to FIG. 11, the first electronic device 102 displays a web page related to the topic on Physics on the browser. Further, the data analyzer module 302 is configured to extract one or more keywords displayed on the browser. For example, the keywords such as static electricity, electric current, waves, sound waves and music, light waves and color are extracted from the web page. Further, the semantic analyzer module 304 can be configured to determine semantically associated extracted keywords such as resonance and standing waves, physics of musical instruments, diffraction and interferences or the like. Further, the controller module 312 can be configured to determine the implicit intent of the first user to get information about physics from one or more second electronic devices 104.

Figure 12A:
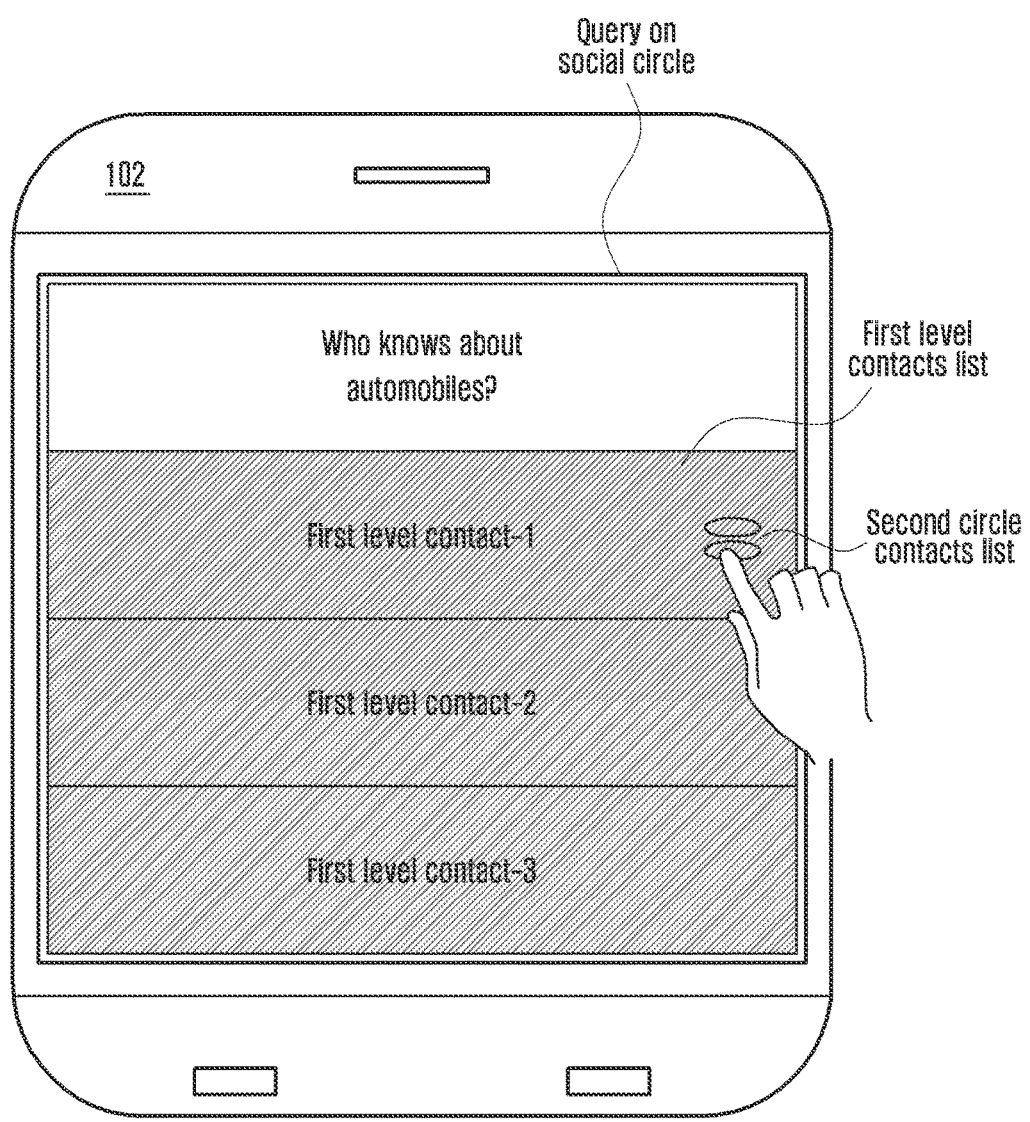
FIGS. 12A and 12B show examples illustration of determining experts in social circles of the user based on a search query associated with an application according to various embodiments of the present disclosure.
Figure 12B:
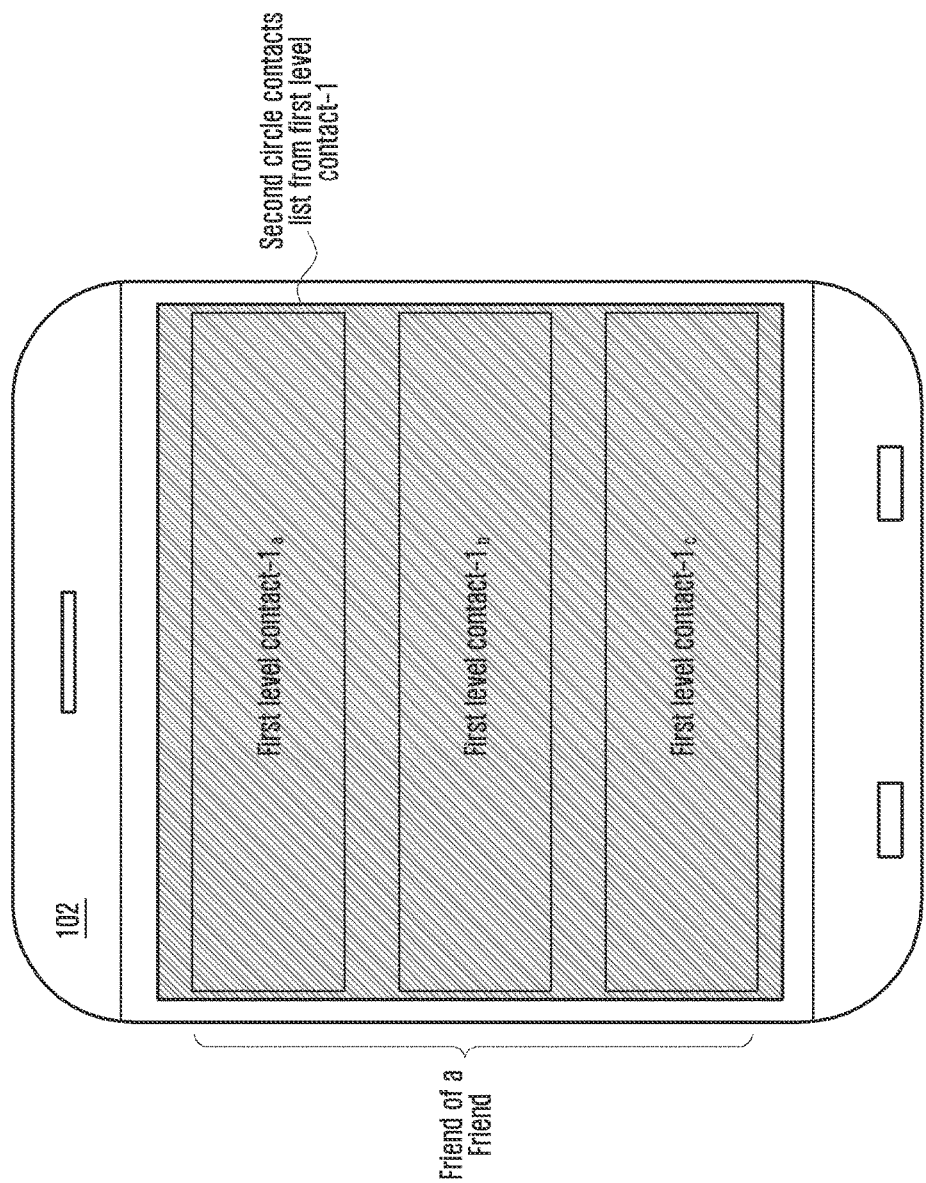

FIGS. 12A and 12B shows examples illustration of determining experts in social circles of the user based on a search query associated with an application according to various embodiments of the present disclosure.

Referring to FIG. 12A, the first electronic device 102 displays a query omnibus on the UI of the first electronic device 102. Further, the method allows the first user to specify a query on the UI of the first electronic device 102. For example, a query regarding information about automobiles is provided on the UI of the first electronic device 102 by the first user. Further, the method allows the controller module 312 to interpret the query, and provides a list of first level of contacts (i.e., first level contact-1, first level contact-2, and first level contact-3) based on the semantic similarity computed between the query and the information stored in the knowledge graph of the first level of contacts. Referring to FIG. 12A, the first level of contacts is the first circle of friends who can provide information for the interpreted query.

In an embodiment, the first circle of friends list is stored in the data sources 202 (i.e., application) where the search query is provided.

Further, the first level of contact-$1_a$ includes a second circle of contacts that can provide information for the search query. Further, the user can view the second circle of contacts (i.e., first level of contact-$1_a$, first level of contact-$1_b$, and first level of contact-$1_c$) by selecting the ellipses provided beside the first level of contact-1.

Referring to FIG. 12B, the first electronic device 102 lists the second circle of contacts available in the first level of contact-1 associated with the second electronic device 104. For example, the second circle of contacts for the first level of contact-1 includes first level of contact-$1_a$, first level of contact-$1_b$, and the first level of contact-$1_c$. Based on the contacts list provided on the first electronic device 102, the method allows the communication module 316 to establish a connection between the first user and the selected contact from the list of first level of contacts for sharing the information.

Figure 13:
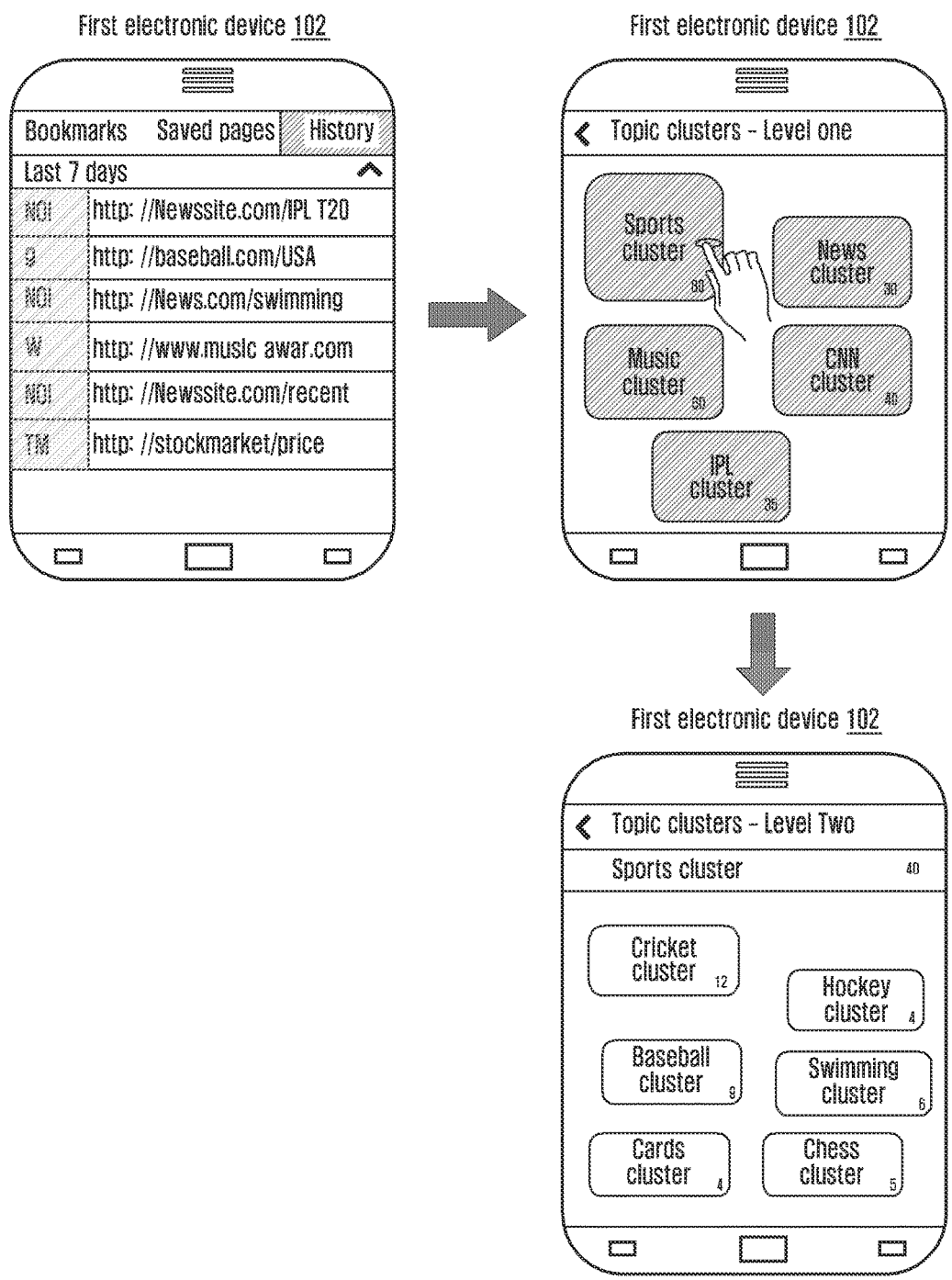
FIG. 13 illustrates an example illustration for dynamically modifying browsed Uniform Resource Locators (URLs) by a first user of a first electronic device according to an embodiment of the present disclosure.

FIG. 13 illustrates an example illustration for dynamically modifying browsed URLs by a first user of a first electronic device 102 according to an embodiment URLs.

Consider a scenario where the first user browsed (or is browsing) the URLs as shown in the FIG. 13. The first electronic device 102 waits for the fixed number of URLs to be browsed by the first user before starting the clustering process. Here, the first user browses 3 news site URLs, 1 stock market URL, 1 baseball URL, and 1 music URL. Initially, the first electronic device 102 will use the pre-loaded cluster models such as sports cluster, News cluster, Music cluster, CNN cluster, and IPL cluster to start mapping one or more URLs that the user has browsed (or is browsing) into corresponding clusters. Before mapping the user browsed URLs to the corresponding clusters, the first electronic device 102 extracts the semantic content from the browsed URLs, where the semantic includes the word vector or the structure data or the topic or the token. The first electronic device 102 maps the semantic content to categorize the user browsed URLs into the knowledge cluster using the incremental model.

As shown in the FIG. 13, the first electronic device 102 categorizes the 3 news site URLs into the News cluster, 1 baseball URL into the sports cluster, 1 music URL into the music cluster. As there is no separate cluster for the stock market, the 1 stock market URL is categorized into the "others" cluster under the sports cluster; thereby, dynamically modifying browser content display of the UI of the first electronic device 102.

The first electronic device 102 may display the URL-categorized individual clusters as a cluster UI. The cluster UI which is Graphic UI (GUI) in the form of a message bubble or window may conform to visual rules discussed above at operation 410 in FIG. 4.

In the cluster UI having GUI in the form of a message bubble or window, the topic or title of cluster may be displayed as text or a representative image (e.g., thumbnail) through the display. Additionally, the number of URLs associated with the cluster may be further displayed as numerals together with text or a representative image.

The first electronic device 102 displays clusters (e.g., sports cluster, news cluster, music cluster, CNN cluster, and IPL cluster) associated with topic cluster level-1 as a cluster UI through the display and receives a touch input (or a touch interaction) from the first user. As discussed above at operation 410 in FIG. 4, a touch input may be a tap input or a pinch zoom gesture. When a touch input is received from the first user with regard to clusters associated with topic cluster level-1, the first electronic device 102 may display sub-cluster (or topic cluster level-2).

In an embodiment, if a tap input or a pinch zoom-out input is received from the first user with regard to clusters associated with topic cluster level-1, the first electronic device 102 may display at least one sub-cluster (or topic cluster level-2) through the display.

For example, when a tap input or a pinch zoom-out input is received from the first user with regard to a sports cluster, the first electronic device 102 may display sub-clusters (or topic cluster level-2) of the sports cluster, e.g., Cricket cluster, Hockey cluster, Baseball cluster, Swimming cluster, Cards cluster, and Chess cluster, as the cluster UI through the display.

Like topic cluster level-1, the sub-cluster (or topic cluster level-2) may display clusters as the cluster UI having GUI in the form of a message bubble or window. At this time, the cluster UI may display the topic or title of cluster as text or a representative image (e.g., thumbnail) and also display the number of URLs associated with the cluster as numerals.

As shown in the FIG. 13, the sports cluster has sub-cluster such as Cricket cluster, Hockey cluster, Baseball cluster, swimming cluster, Cards cluster, and Chess cluster. For example, pre-defined cluster models are stored in the first electronic device 102. Along with the pre-defined clusters, a general cluster model is also stored in the first electronic device 102. Wherever the first user browses a certain number of URLs, the first electronic device 102 determines a topic similarity between the browsed URLs and the pre-defined clusters. If it is determined that the topic similarity is detected then the first electronic device 102 maps the user browsed URLs to the pre-defined clusters. If it is determined that the topic similarity is not detected then the first electronic device 102 maps the URLs to the general cluster. If the general cluster exceeds certain number of URLs then the first electronic device 102 runs the LDA clustering model on the general cluster to determine new clusters.

If a tap input or a pinch zoom-in input is received again from the first user while the sub-cluster is displayed on the display, the first electronic device 102 may display the cluster UI of topic cluster level-1.

Figure 14:
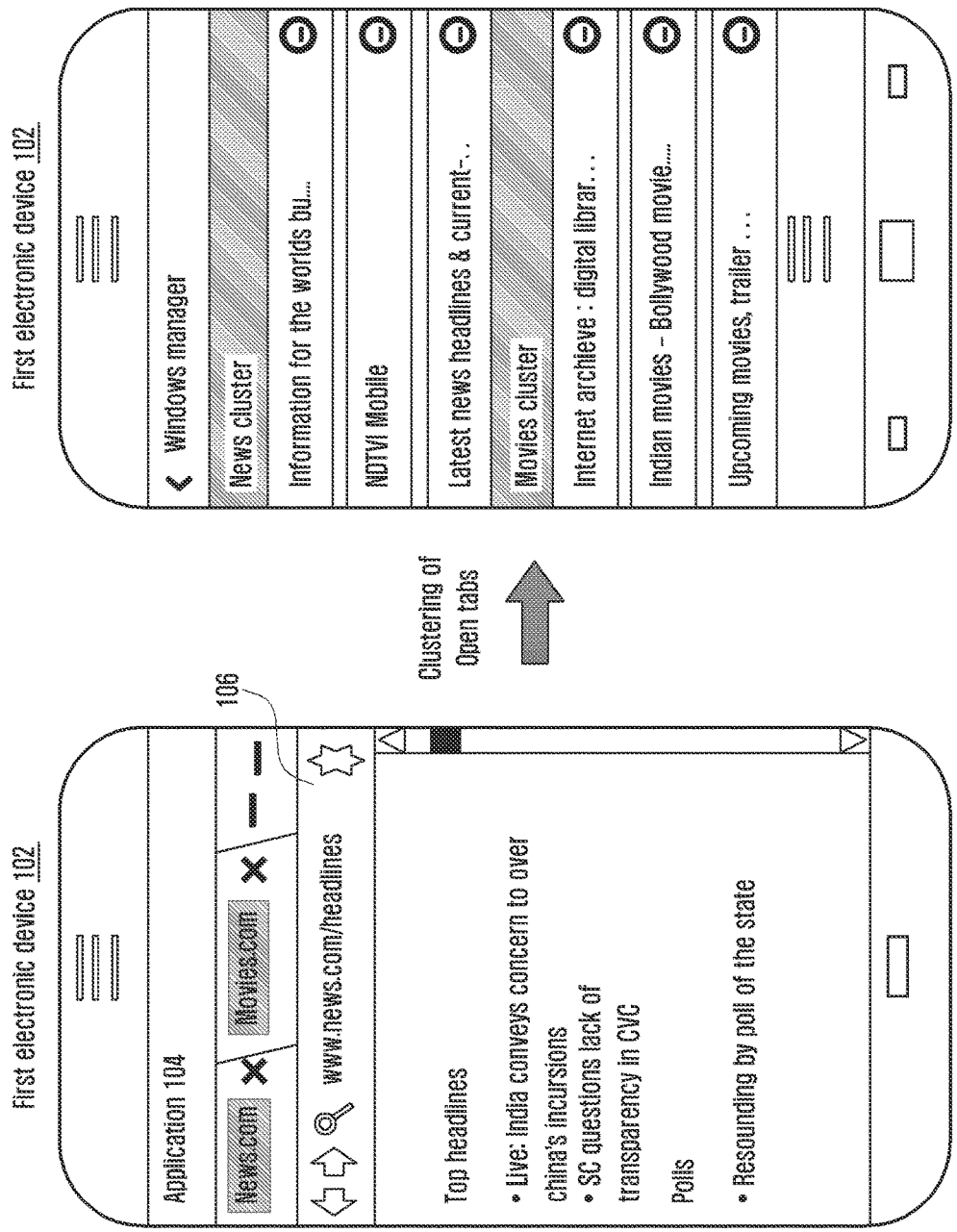
FIG. 14 is an example illustration for dynamically modifying open tabs by a first user of a first electronic device according to an embodiment of the present disclosure.

FIG. 14 is an example illustration for dynamically modifying open tabs by a first user of a first electronic device 102 according to an embodiment of the present disclosure.

Consider a scenario where the first user is simultaneously accessing different web pages by opening one or more tabs (e.g., up to 50 tabs) in the browser application. The first user accesses 3 news web pages and 3 movie web pages by opening 6 tabs in the browser application of the first electronic device 102, as shown in the FIG. 14 (for convenience only 2 open tabs are shown). In another scenario, the user can access simultaneously up to 50 web pages by opening 50 tabs in the browser application. Based on the semantic similarity of the web pages accessed by the user by opening 6 tabs simultaneously can be grouped into knowledge clusters. As shown in the FIG. 14, 3 open tabs corresponding to news web pages are categorized under the News cluster and the 3 open tabs corresponding to movies web pages are categorized under the Movies cluster.

Figure 15A:
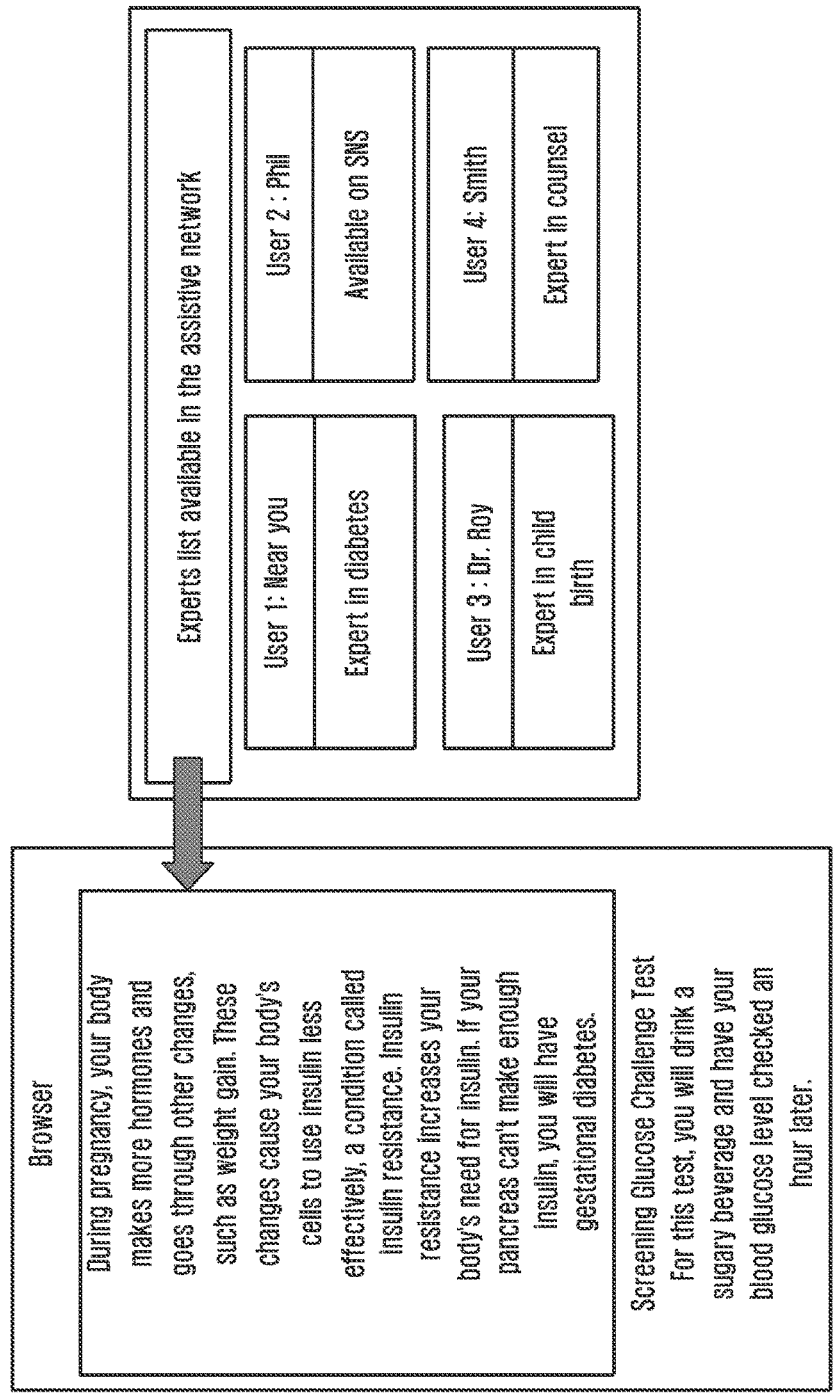
FIGS. 15A and 15B are examples illustration of determining the user's intent and displaying one or more experts associated with the second electronic devices willing to assist the user's intent according to various embodiments of the present disclosure.
Figure 15B:
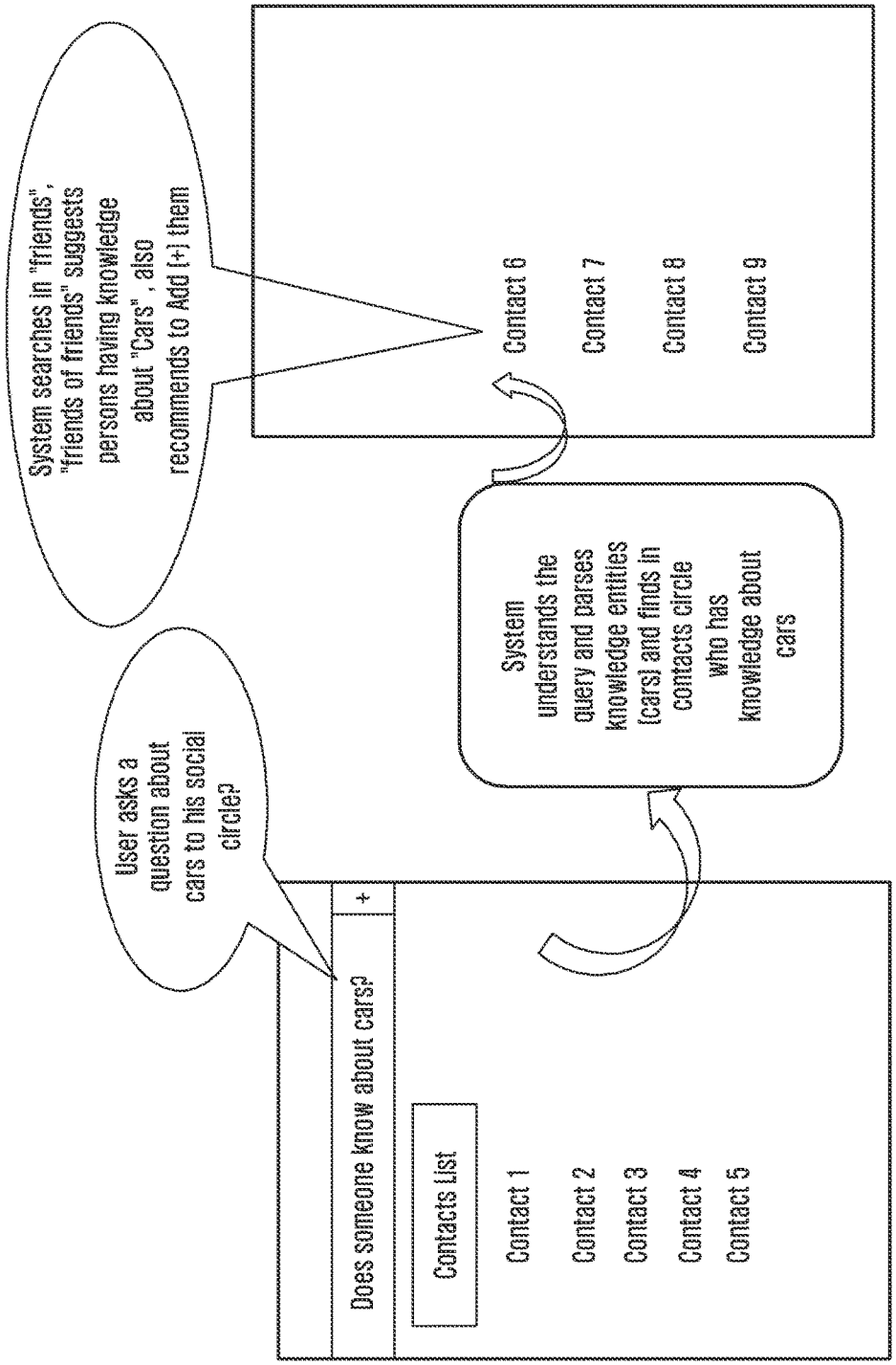

FIGS. 15A and 15B are examples illustration of determining the user's intent and displaying one or more experts associated with the second electronic devices 104 willing to assist the user's intent according to various embodiments of the present disclosure.

If the user is browsing a website having specific information, the electronic device may understand the intent of the user as desiring to search for the specific information. After identifying the intent of the user, the electronic device may display, as UI through the display, contacts of experts or other persons associated with the specific information. Together with contact, at least one of a location of a contact owner, communication availability of a contact owner, and means of communication may be displayed.

Referring to FIG. 15A, the user is browsing a website that has information about gestational diabetes. Further, as the first user associated with the first electronic device 102 browses more on topics related to gestational diabetes, the first electronic device 102 determines the intent of the user i.e., "gestational diabetes". After identifying the intent of the user, the proposed method displays one or more experts identified within the network 106 and within the vicinity of the user. Further, the method allows the user to communicate with one or more experts displayed in the browser based on the expert's availability. Further, FIG. 15B depicts that the proposed method allows the first user to provide a search query in an omnibus bar associated with an application running in the first electronic device 102. In the current example, the first user is providing a query for retrieving information related to cars in the first circle of contacts of the first user stored in the first electronic device 102. Based on the query, the first electronic device 102 displays the first circle of contacts stored in the first electronic device 102 and allows the first user to select the second circle of contacts from the first circle of contacts. Further, the first user can select one or more contacts displayed on the first electronic device 102 to retrieve more information about cars.

Figure 16:
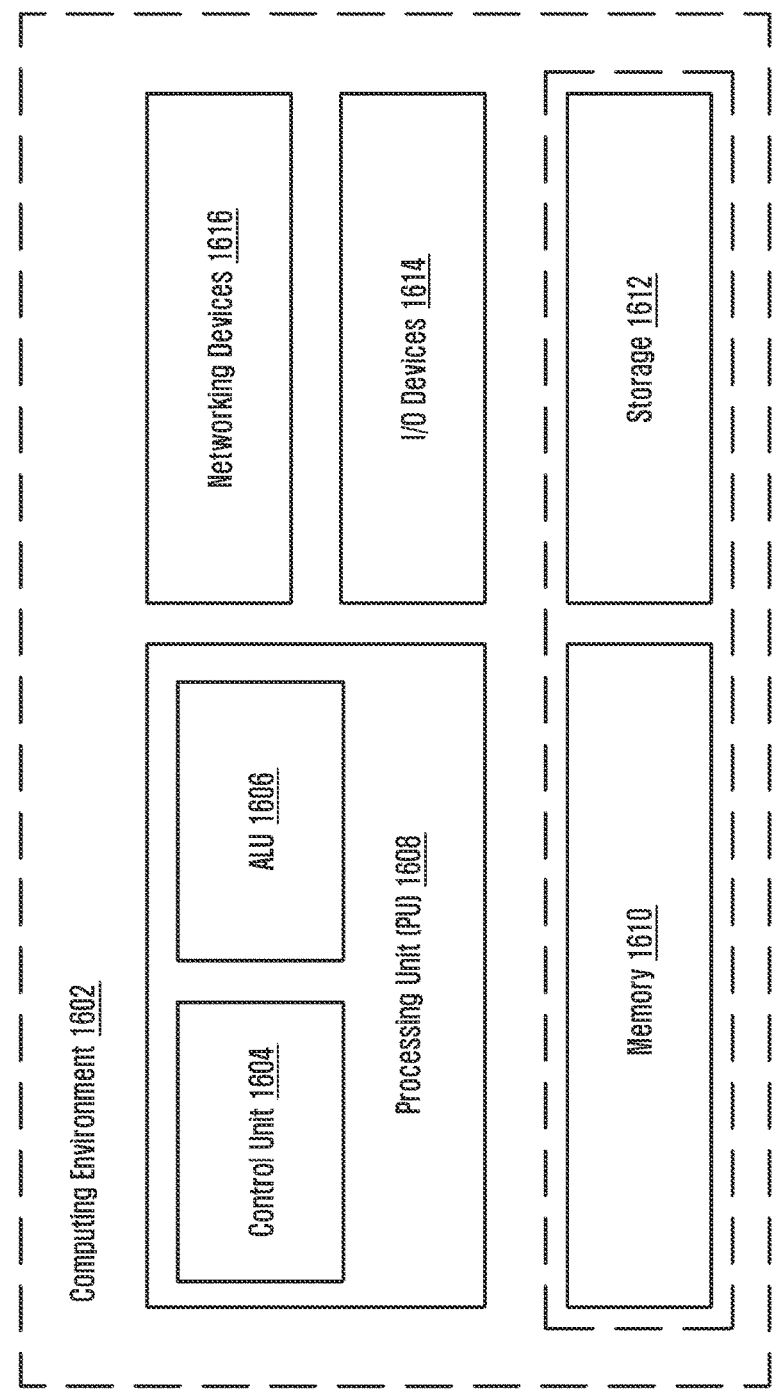
FIG. 16 illustrates a computing environment implementing the method and system for dynamically modifying one or more elements of a UI of an electronic device based on the user knowledge graph according to an embodiment of the present disclosure.

FIG. 16 illustrates a computing environment implementing the method and system for dynamically modifying one or more elements of a UI of an electronic device based on the user knowledge graph according to an embodiment of the present disclosure.

Referring to FIG. 16, the computing environment 1602 comprises at least one processing unit 1608 that is equipped with a control unit 1604 and an Arithmetic Logic Unit (ALU) 1606, a memory 1610, a storage unit 1612, plurality of networking devices 1616 and a plurality Input output (I/O) devices 1614. The processing unit 1608 is responsible for processing the instructions of the algorithm. The processing unit 1608 receives commands from the control unit in order to perform its processing. Further, any logical and arithmetic operations involved in the execution of the instructions are computed with the help of the ALU 1606.

The overall computing environment 1602 can be composed of multiple homogeneous and/or heterogeneous cores, multiple CPUs of different kinds, special media and other accelerators. The processing unit 1608 is responsible for processing the instructions of the algorithm. Further, the plurality of processing units 1608 may be located on a single chip or over multiple chips.

The algorithm comprising of instructions and codes required for the implementation are stored in either the memory unit 1610 or the storage 1612 or both. At the time of execution, the instructions may be fetched from the corresponding memory 1610 and/or storage 1612, and executed by the processing unit 1608.

In case of any hardware implementations various networking devices 1616 or external I/O devices 1614 may be connected to the computing environment to support the implementation through the networking unit and the I/O device unit.

The various embodiments disclosed herein can be implemented through at least one software program running on at least one hardware device and performing network management functions to control the elements. The elements shown in FIGS. 1A, 1B, 2, 3, 5, 12A, 12B, 13, 14, and 16 include blocks which can be at least one of a hardware device, or a combination of hardware device and software module.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method to dynamically modify at least one element of a user interface (UI) of a first electronic device, the method comprising:
    collating usage information of at least one data source associated with a user in the first electronic device, wherein each data source is at least one item used in the first electronic device or any application running on the first electronic device;
    categorizing the collated usage information into at least one knowledge cluster, wherein the categorizing includes extracting semantic content from the usage information and mapping the extracted semantic content to categorize the collated usage information into the at least one knowledge cluster using an incremental model;
    storing a knowledge graph including the at least one knowledge cluster in a form of at least one knowledge node in the knowledge graph and at least one link among the at least one knowledge node; and
    dynamically modifying the at least one element of the UI based on the knowledge graph,
    wherein the dynamically modifying includes identifying the at least one knowledge cluster from the knowledge graph and displaying the at least one identified knowledge cluster as the at least one element of the UI.

2. The method of claim 1, wherein the knowledge graph is stored locally in the first electronic device.

3. The method of claim 1,
    wherein the semantic content comprises at least one of a word vector, a structure data, a topic, or a token, and
    wherein the at least one knowledge cluster is incrementally updated.

4. The method of claim 3, wherein the word vector connects extracted semantic content mapped to at least two entries in the knowledge graph.

5. The method of claim 1, wherein the method further comprises sharing the knowledge graph of the first electronic device with a second electronic device in a knowledge-based assistive network.

6. The method of claim 1, wherein the dynamic modifying of the at least one element of the UI based on the knowledge graph comprises:
    receiving a localized query by a second electronic device from a server, the localized query comprising at least one semantic content;
    computing a semantic similarity between the at least one semantic content and a knowledge graph stored in the second electronic device; and
    displaying a recommendation message on the at least one element of the UI of the first electronic device based on semantic similarity, the recommendation message comprising data about the second electronic device.

7. The method of claim 1,
    wherein the method further comprises:
        monitoring the usage information of the at least one data source in the first electronic device, and
        updating the at least one knowledge cluster based on the monitoring using an incremental model, and
    wherein the updating comprises at least one of adding a semantic content to the at least one knowledge cluster, splitting the at least one knowledge cluster, or merging the at least one knowledge cluster.

8. The method of claim 1, wherein the dynamic modifying of the at least one element of the UI based on the knowledge graph comprises:
displaying one or more clusters on the UI according to one or more rules; and
displaying a lower cluster or an upper cluster of the one or more clusters on the UI in response to a user's touch input.

9. The method of claim 8, wherein the displaying of the lower cluster or the upper cluster comprises:
displaying the lower cluster on the UI when the user's touch input is a pinch zoom-out input with regard to the upper cluster; and
displaying the upper cluster on the UI when the user's touch input is a pinch zoom-in input with regard to the lower cluster.

10. The method of claim 1, wherein each entry in the knowledge graph comprises an associated user expertise.

11. A system configured to dynamically modify at least one element of a user interface (UI) of a first electronic device, wherein the system is configured to:
collate usage information of at least one data source associated with a user in the first electronic device, wherein each data source is at least one item used in the first electronic device or any application running on the first electronic device;
categorize the collated usage information into at least one knowledge cluster, wherein the categorizing includes extracting semantic content from the usage information and mapping the extracted semantic content to categorize the collated usage information into the at least one knowledge cluster using an incremental model;
store a knowledge graph including the at least one knowledge cluster in a form of at least one knowledge node in the knowledge graph and at least one link among the at least one knowledge node; and
dynamically modify the at least one element of the UI based on the knowledge graph,
wherein the dynamically modifying includes identifying the at least one knowledge cluster from the knowledge graph and displaying the at least one identified knowledge cluster as the at least one element of the UI.

12. The system of claim 11, wherein the knowledge graph is stored locally in the first electronic device.

13. The system of claim 11,
wherein the semantic content comprises at least one of a word vector, a structure data, a topic, or a token, and
wherein the at least one knowledge cluster is incrementally updated.

14. The system of claim 13, wherein the word vector connects extracted semantic content mapped to at least two entries in the knowledge graph.

15. The system of claim 11, wherein the system is configured to share the knowledge graph of the first electronic device with a second electronic device in a knowledge-based assistive network.

16. The system of claim 11, wherein the system is further configured to:
receive a localized query by a second electronic device from a server, the localized query comprising at least one semantic content;
compute a semantic similarity between the at least one semantic content and a knowledge graph stored in the second electronic device; and
display a recommendation message on the at least one element of the UI of the first electronic device based on the semantic similarity, the recommendation message comprising data about the second electronic device.

17. The system of claim 11, wherein the system is further configured to:
monitor the usage information of the at least one data source in the first electronic device; and
update the at least one knowledge cluster based on the monitoring using an incremental model, the updating comprising at least one of adding a semantic content to the at least one knowledge cluster, splitting the at least one knowledge cluster, or merging the at least one knowledge cluster.

18. The system of claim 11, wherein each entry in the knowledge graph comprises an associated user expertise.

19. An electronic device comprising:
a communicator;
a display configured to display a user interface (UI);
a touch sensitive unit configured to receive a user's touch input; and
at least one processor configured to:
collate usage information of at least one data source associated with a user in the electronic device, wherein each data source is at least one item used in the electronic device or any application running on the electronic device,
categorize the collated usage information into at least one knowledge cluster, wherein the categorizing includes extracting semantic content from the usage information and mapping the extracted semantic content to categorize the collated usage information into the at least one knowledge cluster using an incremental model,
store a knowledge graph including the at least one knowledge cluster in a form of at least one knowledge node in the knowledge graph and at least one link among the at least one knowledge node, and
dynamically modify at least one element of the UI based on the knowledge graph,
wherein the dynamically modifying includes identifying the at least one knowledge cluster from the knowledge graph and displaying the at least one identified knowledge cluster as the at least one element of the UI.

20. The electronic device of claim 19, wherein the knowledge graph is stored locally in the electronic device.

21. The electronic device of claim 19,
wherein the semantic content comprises at least one of a word vector, a structure data, a topic, or a token, and
wherein the at least one knowledge cluster is incrementally updated.

22. The electronic device of claim 19, wherein the at least one processor is further configured to share the knowledge graph with another electronic device in a knowledge-based assistive network.

23. The electronic device of claim 19, wherein the at least one processor is further configured to:
receive a localized query by other electronic device from a server, wherein the localized query comprises at least one semantic content,
compute a semantic similarity between the at least one semantic content and a knowledge graph stored in the other electronic device, and
display a recommendation message on at least one element of the UI of the electronic device based on semantic similarity, the recommendation message comprising data about the other electronic device.

24. The electronic device of claim 19, wherein the at least one processor is further configured to:
monitor the usage information of the at least one data source in the electronic device, and
update the at least one knowledge cluster based on the monitoring using an incremental model.

25. The electronic device of claim 24, wherein the at least one processor is further configured to update the at least one knowledge cluster through at least one of adding a semantic content to the at least one knowledge cluster, splitting the at least one knowledge cluster, or merging the at least one knowledge cluster.

26. The electronic device of claim 14, wherein the at least one processor is further configured to:
display one or more clusters on the UI according to one or more rules, and
display a lower cluster or an upper cluster of the one or more clusters on the UI in response to a user's touch input.

27. The electronic device of claim 26, wherein the at least one processor is further configured to:
display the lower cluster on the UI when the user's touch input is a pinch zoom-out input with regard to the upper cluster, and
display the upper cluster on the UI when the user's touch input is a pinch zoom-in input with regard to the lower cluster.

28. The electronic device of claim 19, wherein the at least one knowledge node in the knowledge graph is weighted based on at least one of the user's knowledge or the user's level of knowledge.

29. The method of claim 1, wherein the at least one knowledge node in the knowledge graph is weighted based on at least one of the user's knowledge or the user's level of knowledge.

30. The system of claim 11, wherein the at least one knowledge node in the knowledge graph is weighted based on at least one of the user's knowledge or the user's level of knowledge.

* * * * *